US005542078A

United States Patent [19]
Martel et al.

[11] Patent Number: 5,542,078
[45] Date of Patent: Jul. 30, 1996

[54] OBJECT ORIENTED DATA STORE INTEGRATION ENVIRONMENT FOR INTEGRATION OF OBJECT ORIENTED DATABASES AND NON-OBJECT ORIENTED DATA FACILITIES

[75] Inventors: Paul A. Martel, Fitchburg; Craig S. Harris, Acton, both of Mass.

[73] Assignee: Ontos, Inc., Burlington, Mass.

[21] Appl. No.: 315,394

[22] Filed: Sep. 29, 1994

[51] Int. Cl.⁶ ............................................... G06F 17/30
[52] U.S. Cl. ............................................ 395/600; 395/700
[58] Field of Search .................................. 395/600, 650, 395/700

[56] References Cited

U.S. PATENT DOCUMENTS

| | | | |
|---|---|---|---|
| 4,525,780 | 6/1985 | Bratt et al. | 364/200 |
| 4,853,843 | 8/1989 | Ecklund | 364/200 |
| 4,864,497 | 9/1989 | Lowry et al. | 364/300 |
| 4,943,933 | 7/1990 | Miyamoto et al. | 364/513 |
| 4,953,080 | 8/1990 | Dysart et al. | 364/200 |
| 4,989,132 | 1/1991 | Mellender et al. | 364/200 |
| 5,008,853 | 4/1991 | Bly et al. | 364/900 |
| 5,079,695 | 1/1992 | Dysart et al. | 395/700 |
| 5,093,914 | 3/1992 | Coplien et al. | 395/700 |
| 5,113,522 | 5/1992 | Dinwiddie, Jr. et al. | 395/700 |
| 5,125,091 | 6/1992 | Staas, Jr. et al. | 395/650 |
| 5,129,083 | 7/1992 | Cutler et al. | 395/650 |
| 5,129,084 | 7/1992 | Kelly, Jr. et al. | 395/650 |
| 5,136,712 | 8/1992 | Perazzoli, Jr. et al. | 395/700 |
| 5,142,674 | 8/1992 | Barker et al. | 395/600 |
| 5,157,777 | 10/1992 | Lai et al. | 395/425 |
| 5,161,223 | 11/1992 | Abraham | 395/600 |
| 5,161,225 | 11/1992 | Abraham et al. | 395/600 |
| 5,170,466 | 12/1992 | Rogan et al. | 395/145 |
| 5,175,848 | 12/1992 | Dysart et al. | 395/600 |
| 5,185,885 | 2/1993 | Dysart et al. | 395/600 |
| 5,187,786 | 2/1993 | Densmore et al. | 395/600 |
| 5,187,787 | 2/1993 | Skeen et al. | 395/600 |
| 5,187,790 | 2/1993 | East et al. | 395/725 |
| 5,193,180 | 3/1993 | Hastings | 395/575 |
| 5,206,951 | 4/1993 | Khoyi et al. | 395/650 |
| 5,265,206 | 11/1993 | Shackelford et al. | 395/200 |
| 5,291,583 | 3/1994 | Bapat | 395/500 |
| 5,291,593 | 3/1994 | Abraham et al. | 395/600 |
| 5,327,559 | 7/1994 | Priven et al. | 395/700 |
| 5,386,564 | 1/1995 | Shearer et al. | 395/650 |
| 5,388,264 | 2/1995 | Tobias, II et al. | 395/650 |

OTHER PUBLICATIONS

P. Butterworth et al. "The Gemstone Object Database Management System" Comm. ACM, V. 34, N. 10, pp. 65–77, Oct. 1991.

J. Joseph et al. "Object–Oriented Databases: Design and Implementation" Proc. IEEE, V. 79, N. 1, pp. 42–64, Jan. 1991.

D. Fishman et al. "IRIS: An Object–Oriented Database Management System" ACM Trans Ofc Info Sys, V. 5, N. 1, pp. 48–69, Jan. 1987.

(List continued on next page.)

*Primary Examiner*—Thomas G. Black
*Assistant Examiner*—Peter Y. Wang
*Attorney, Agent, or Firm*—Weingarten, Schurgin, Gagnebin & Hayes

[57] ABSTRACT

A method and apparatus for accessing and effectively integrating non-object oriented data stores with object applications. An integrating environment is implemented wherein an application using a distributed object database and object database management system (ODBMS) is provided with an interface to external data stores in a manner so as to effect location transparency. The application, accessing data via the ODBMS, can manipulate data in foreign data stores which include external data that is mapped and converted into objects for use by object applications. A storage management application program interface ("SM API"), effects a functional interface for handling objects, referencing objects, implementing iteration and indexing of objects, and implementing object transaction and cache handling. The SM API is part of a modular architecture that includes an external storage manager which implements classes that provide the foundation for engaging external data stores, and which maps and converts external data into objects that can be manipulated by an application using the ODBMS.

10 Claims, 7 Drawing Sheets

OTHER PUBLICATIONS

W. Kim "Object–Oriented Databases: Definition and Research Directions" IEEE Trans Know. and Data Engr, V. 2, N. 3, pp. 324–341, Sep. 1990.

"Object–Oriented Computing", by David C. Rine, et al. Computer, Oct. 1992, pp. 6–10.

"Integrating Objects with Relational Technology", by Mary E. S. Loomis, Object Magazine Jul./Aug. 1991.

"Objects and SQL: Accessing Relational Databases", by Mary E. S. Loomis, Object Magazine Sep./Oct. 1991, pp. 68–78.

"Object Identity", by Setrag N. Khoshaflan, et al., Microelectronics and Computer Technology Corp., pp. 37–46, Date unknown.

"The Object–Oriented Database System Manifesto", by Malcolm Atkinson, pp. 40–57, Date unknown.

"A Description of Object Databases", by Tim Andrews, Distrubted Information, Jan. 1993.

"Client–Server Architecture", by Mary E. S. Loomis, Journal of Object–Oriented Programming, Feb. 1992.

"Object Database–Integrator For PCTE", by Mary E. S. Loomis, Journal of Object–Oriented Programming, May 1992.

"ODBC", by Karen Watterson, Microsoft SQL Server Connection, undated, pp. 13–18.

"Answer: ZIM—A Professional, Integrated Application Development Environment", Sterling Software, Inc. 1994.

"Versant ODBMS", Versant Object Technology, 1992.

"Versant Executive Overview", Versant Object Technology, 1992.

PITCHER TABLE

| NAME | CAREER_WINS | CAREER_LOSSES | CAREER_STARTS | SEASON_WINS | SEASON_LOSSES | SEASON_STARTS |
|---|---|---|---|---|---|---|
| JON ANDREWS | 22 | 0 | 22 | 22 | 0 | 22 |
| KEITH M SALLY | 2 | 0 | 2 | 2 | 0 | 2 |
| ... | ... | ... | ... | ... | ... | ... |
| ... | ... | ... | ... | ... | ... | ... |
| ... | ... | ... | ... | ... | ... | ... |

PLAYER TABLE

| NAME | TEAM _NAME | PLAYER _NUMBER | CAREER _BATTING _AVERAGE | SEASON _BATTING _AVERAGE |
|---|---|---|---|---|
| JON ANDREWS | TIGERS | 22 | 600 | 622 |
| KIETH McSALLY | TIGERS | 48 | 248 | 200 |
| ... | ... | ... | ... | ... |
| ... | ... | ... | ... | ... |
| ... | ... | ... | ... | ... |
| ... | ... | ... | ... | ... |
| ... | ... | ... | ... | ... |

*FIG. 4B*

TEAM TABLE

| NAME | DIVISION _NAME | CITY | SEASON _WINS | SEASON _LOSSES |
|---|---|---|---|---|
| TIGERS | AMERICAN EAST | DARLINGTON | 25 | 7 |
| ... | ... | ... | ... | ... |
| ... | ... | ... | ... | ... |

*FIG. 4C*

OBJECT ORIENTED DATA STORE INTEGRATION ENVIRONMENT FOR INTEGRATION OF OBJECT ORIENTED DATABASES AND NON-OBJECT ORIENTED DATA FACILITIES

FIELD OF THE INVENTION

The present invention relates to computer databases, and more particularly to integration of object oriented databases and non-object oriented data facilities.

BACKGROUND OF THE INVENTION

Various means and methodologies exist presently for persistent storage of data for use in computer system applications. Known database management systems (DBMS's) facilitate storage of data in non-volatile storage, e.g. disks, tapes, etc, for use even after the program that used or generated the data is terminated ("persistence"). In addition to persistence, DBMS's fundamentally provide "concurrency control" so users of data can share a database without interfering with each other or compromising the integrity of data, and "recovery" features to protect and restore data integrity upon system (hardware or software) failures. DBMS "query" facilities enable users to access the large volumes of data within a database by specifying some particular characteristic or field within data records, while "security" features are typically built into DBMS's to limit access to some data. Known DBMS's support "schema management" for describing properties of, and relationships between, data in a database.

With the evolution of DBMS technology, fundamental functionality as described hereinbefore has been maintained and expanded while data complexity and processing performance requirements have increased. A type of data management technology applied in commercial data processing known as "relational" DBMS, is modeled to be relatively simplistic in that all data is organized as though it is formatted into tables, with the table columns representing the table's fields or domains and the table rows representing the values of the table's fields or domains. Data is logically organized as tables but is not necessarily physically stored as such. The relational database user does not need to know how the database is physically constructed and can access and update data via a language interface or "structured query language" (SQL).

The relative complexity of data associated with science and engineering problem solving, and the evolution of complex data structures and data entities modeled on real-world objects led to the development of a new generation of DBM's known as "object DBM's" (ODBM's) or "object oriented DBM's" (OODBM's). ODBM's do not conform to the relational model but provide virtually the same fundamental functionality (i.e. persistence, concurrency control, recovery, security, query facilities and schema management) for storing and manipulating object entities. Object entities or "objects", are complex data structures which model real-world entities, and are associated in classes and identified with their informational features (attributes) and functional features (behaviors). Objects are effected using object oriented programming (OOP) languages such as C++ and Smalltalk. By defining complex, specialized data structures or objects that model real-world entities, program development is made easier and more natural as the level of abstraction of data is raised to a point where applications can be implemented effectively in the same terms in which they are described by the users of the application. Objects are more readily classifiable into types, which are easily related to one another in subtype/supertype hierarchies. OOP languages permit the programmer to flexibly define data types so as not to be constrained by limited predefined types. OOP language types can be associated in classes which can "inherit" attributes and/or behaviors from other classes. Complex object data structures and types are not supported by the relational DBMS model, but by ODBM's which facilitate direct storage and manipulation of objects, without the need to map them into tables.

Relational DBM's and Object DBM's co-exist presently, with little likelihood that one will completely displace the other. Each type of DBMS (i.e. Relational and Object) is best suited for respective particular applications, e.g. Relational for the predefined data types of business data processing such as in the insurance and banking industries; and Object for the extensible data structures modeled on real-world entities such as used in computer-aided design and computer-aided software engineering. However, with the considerable investment associated with existing relational data stores, and the continuing evolution toward and appreciation for object applications, there exists a need for integrating object and relational technologies.

The need for integration of relational and object data typically will arise in situations where new object oriented applications are implemented to take advantage of aspects of object oriented programming in a context where data was/is managed according to the relational model. Known means of integrating object programming with a relational database include doing a manual, programming intensive conversion of all the relational data in the relational DBMS to object data, that is readily accessible to the object oriented programs. However, in addition to the significant efforts required for such conversion, there typically are non-object oriented application programs that continue to require access to the relational data. Thus, disadvantageously, it may be necessary to have redundant data stores resulting in duplicative resources and greater overhead. Additionally the task of updating and maintaining the Relational and Object versions of the DBMS creates difficulties in that updates must be substantially simultaneously coordinated and may have to be replicated in disparate environments. Even if the entire collection of existing programs that access the relational database are rewritten in an object oriented programming language, such a mode of conversion is an expensive, complicated and time consuming endeavor.

Standardized import/export facilities are known which permit importation of data in a predictable input format into an object database. The import/export facility is a program, implementation of which requires knowledge of the schema or format of the relational data. Additionally, the relational data elements must be mapped to objects within an ODBMS which are to be managed by the ODBMS which consequently manages the mapped relational data elements. Such facilities, however, lack flexibility in that a predefined format is required for representing data that is to be passed between relational and object environments. While the import/export facility effectively acts as a translation mechanism, there must be rigid adherence to the predefined format in which the relational data is maintained, otherwise it cannot be mapped to objects and managed by the ODBMS.

Translation techniques in the form of SQL Gateways are known which allow object language programs to retrieve relational data from a relational database in a form approximating objects rather than tables. A programmer must know the organization or schema of the particular data required and is typically limited to use of the data in a format very close to its original relational format. The programmer uses an object oriented programming language to implement a SQL statement or request that acts on the tables of a relational database. The SQL Gateway converts OOP language statements into SQL statements and converts table rows or relational data into objects. Such a mechanism requires the application programmer to be cognizant of and accommodate the technology differences between the relational and object database systems. The programmer must write application code to use the SQL Gateway which requires an understanding of the SQL, and the relational and object oriented paradigms. Gateways do not provide unified access to disparate relational data stores through a single consistent application program interface.

Further, while Gateways provide effective conversion between objects and relational data structures, they do not support a means for identifying objects, which makes it difficult to determine if a data request by an application can be satisfied by data already cached. This can result in redundant accesses to the data stores negatively impacting application performance, and problems with data replication, both of which require substantial additional overhead and coding in the application to prevent or work around. Also, schema information in Gateways is maintained in the foreign data store in a relational format. Runtime access to such schema information requires additional programming at the application level for such information to be available as OOP language objects.

SUMMARY OF THE INVENTION

The present invention provides a method and apparatus for accessing and effectively integrating non-object oriented data stores with object applications. An integrating environment is implemented wherein an application using a distributed object database and object database management system (ODBMS) is provided with an interface to external data stores in a manner so as to effect location transparency. The application, accessing data via the ODBMS, can manipulate data in foreign data stores which include external data that is mapped and converted into objects for use by object applications.

A storage management application program interface (hereinafter referred to as "SM API"), effects a functional interface for handling objects, referencing objects, implementing iteration and indexing of objects, and implementing object transaction and cache handling. The SM API is part of a modular architecture that includes an external storage manager which unifies access to external data stores by implementing a single consistent ODBMS API which is well integrated with OOP language(s). The external storage manager implements classes that provide the foundation for engaging external data stores, and maps and converts external data into objects that can be manipulated by an application using an ODBMS. Keys are used to assign object identities to external data, which allows data that is already cached by an application to be identified by its key and located in cache in response to repeated requests for the same data.

Features of the invention include provision of the capabilities to access external data stores including non-object databases with various paradigms, schemas and file formats, by an object database management system. Application developers can use a single object oriented programming paradigm and focus on the object model of their application domain regardless of the underlying storage facilities used to store data used by the application. User-defined storage management components can be developed for accessing a wide variety of external data stores. The benefits of object technology: flexibility, extensibility and reuse of application code, can be appreciated in object applications interfaced to non-object data stores. The investment in existing databases and file systems is preserved while permitting a shift to object oriented applications.

Other features, advantages and aspects of the invention are explained in: ONTOS DB 3.0 Reference Manual Volume 1 Class Library; ONTOS DB 3.0 Developer's Guide; and ONTOS DB 3.1 External Storage Management Guide, which are all incorporated herein by reference. Reference is also made to portions of ONTOS DB 3.1 Extensible Storage Management Guide as found in the detailed description, below.

DESCRIPTION OF THE DRAWING

The invention will be more fully understood from the following detailed description taken in conjunction with the accompanying drawing in which:

FIG. 4 is a diagrammatic representation of relational data structures of a relational external data store for the example of an implementation of an object oriented data store integration environment according to the invention;

DETAILED DESCRIPTION

Figure 1:
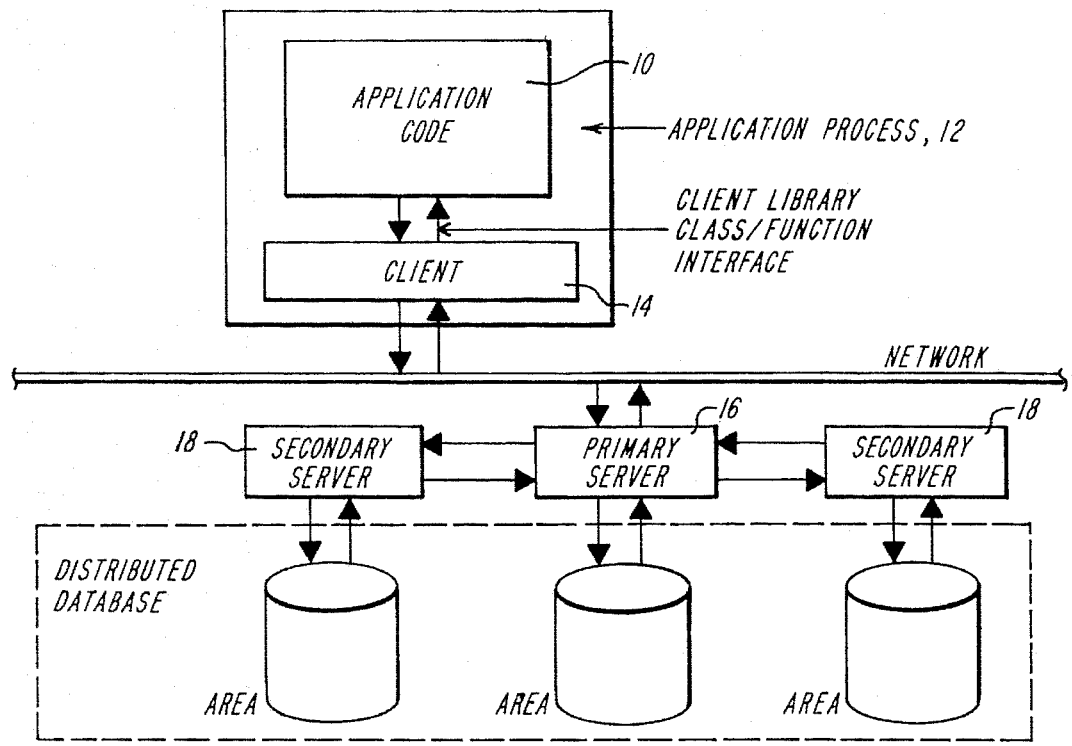
FIG. 1 is a block diagram of a distributed object database having a client-server architecture.

An illustrative embodiment of integration of non-object data stores may be implemented in a distributed database environment, such as an ODBMS like ONTOS DB a product of ONTOS Inc. assignee of the present invention, which uses a client-server architecture to distribute a database around a network. Such a client-server architecture, as illustrated in FIG. 1, involves an application or program 10 written in an object oriented programming (OOP) language, such as C++ or Smalltalk. The application 10 runs in a process on a workstation in a network, as an application process 12. The application process 12 contains the application or program code 10 and a client portion 14 of the distributed database facilities which is implemented within the classes and functions of the distributed database facilities and is effectively transparent to the application 10.

The application 10, when using the distributed database facilities, communicates via the client portion 14 with another process called a primary server 16 running on another host machine somewhere on the network. The primary server 16 is the primary manager of the distributed database facilities, managing its own database area and communicating with secondary servers 18 which manage other areas of the same distributed database.

When the application 10 requires data, such as objects managed by the distributed database facilities, the objects are requested by the client 14, retrieved by the servers 16, 18 and passed to the client 14. The objects are "activated" into the client application's virtual memory and manipulated as OOP structures, such as C++ structures. The application 10 "deactivates" these objects when it is finished with them, optionally deallocates the memory used by them, and passes them back to the client 14. The client 14 passes the objects back to the servers 16, 18 which put changes to the objects in the respective areas of the distributed database.

Figure 2:
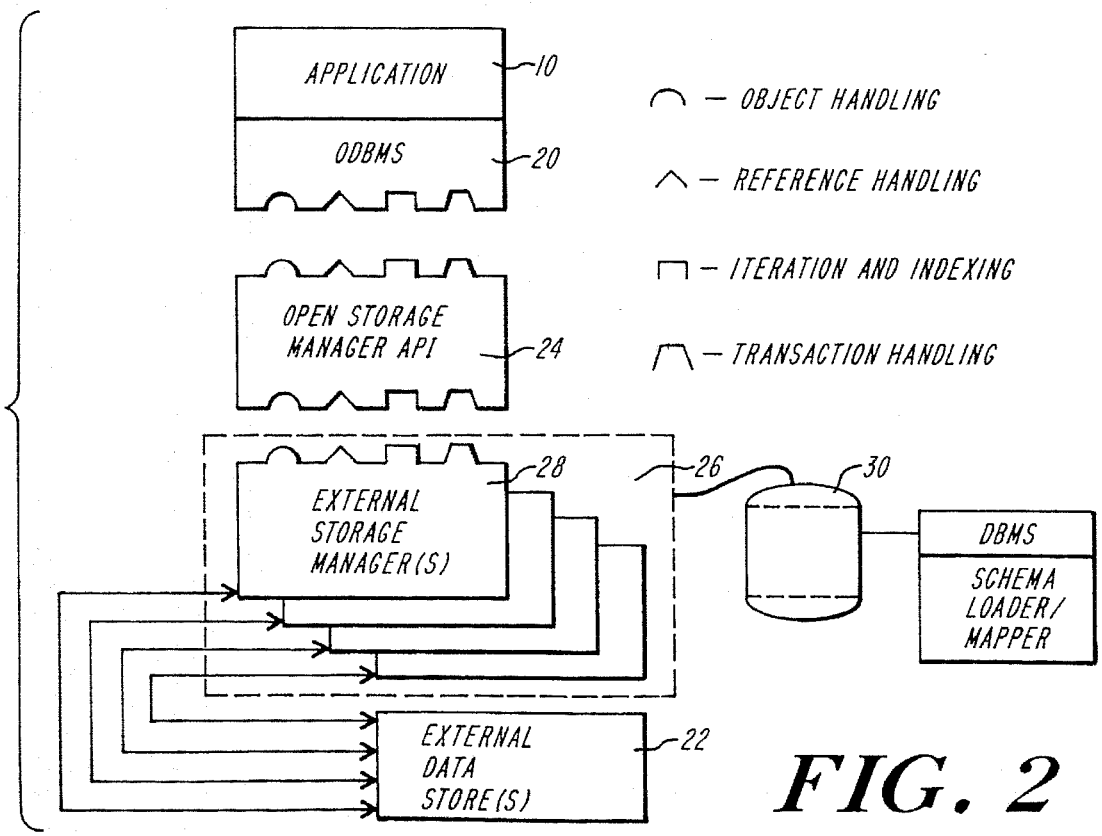
FIG. 2 is a block diagram of a modularly architected integration environment according to the invention.

Referring now to FIG. 2, the object application 10 uses the distributed database facilities of an ODBMS 20 to perform tasks relating to object handling, reference handling, iteration and indexing, and transaction handling, as described hereinafter. While the application 10 utilizes OOP language statements, typically in C++, as a data manipulation language (DML) to access and manipulate data in the ODBMS, the ODBMS must be provided with an interface to foreign or external data stores 22 to effect the required functionality with respect to non-object data or data that is of a substantially different schema than that associated with the object application.

In the illustrative embodiment including ONTOS DB, a modular architecture is implemented wherein an open storage manager application program interface 24 ("SM API") provides an application program interface (API) or open base class that defines generic protocols and functions for storage management, as described in detail in the referenced materials. The SM API 24 essentially effects a plurality of API's to facilitate object handling, reference handling, iteration and indexing, and transaction handling activities. A wide range of object oriented programming and database management systems can be accommodated according to the invention, as long as they support constructs including objects, references, transactions, and indices and extensions.

The functions comprising the SM APE 24 are set forth in the following text, taken from the ONTOS DB 3.1 Extensible Storage Management Guide, Chapters 3–8.

IMPLEMENTING OBJECT HANDLING

Object handling support
  Overview
    A client application assigns a storage manager instance to each OC_Object instance it uses. The application is thus freed to handle objects at a higher level, since it can rely on the storage managers to handle the low-level storage details. At the higher level, the application uses the OC_Object and OC_Reference interfaces to determine which objects are stored persistently, in which state, and for how long.

An OC_Object's storage manager tracks the object's persistent identity (its OID), its persistent representation (its data values as currently stored), and its persistent location (for example, clustering). It also tracks the following mappings:

Between the in-memory object and references to the object
  Between the persistent identity and references to the object
  Between the persistent identity and the in-memory object
  The storage manager also determines how the object is transferred between memory and persistent storage.
  Relation of an object to its storage manager
  For the object handling functions to work properly, they must be called on the storage manager instance that manages the object. The term "manages" connotes that the storage manager either determined the original
Object handling functions
  The OC_StorageManager's object handling interface includes functions to query the status of an OC_Object. It also includes manipulation functions to make updates to the in-memory and persistent states of the object and to translate between the two states.
  Unimplemented functions
  These object handling member functions are pure virtual, so must be implemented by the storage management developer.
  Memory allocation

--- virtual void* allocateObj (long sz, OC_Type* theType,
    OC_Object* where, OC_Clustering howNear);

---

Allocates and initializes a new object. Specify the object's size in bytes with sz and its OC_Type with theType.
  Depending upon the OC_StorageManager's implementation, allocateObj( ) may use the where and howNear arguments to set the clustering object and proximity, respectively. Clustering and the interpretation of clustering levels (OC_defaultClustering, OC_sameArea, and OC_sameSegment) is OC_StorageManager implementation-dependent, so allocateObj( ) may use the clustering arguments as it needs to, or not at all.
  This function raises exception OC_SystemLimitation when an OC_StorageManager resource is depleted. An example of such a resource is an in-memory reference or object space for a storage manager with a fixed-size cache.
  This function is called by OC_Object::operator new( ).
  virtual void deallocateObj(void* ent);
  Deallocates the memory that was used by *ent, which was an OC_Object-based instance.
  This function is called by OC_Object::operator delete( ).
  Implementation of deallocateObj( ) should be complementary to the implementation of allocateObj( ). For example, if allocateObj( ) allocates memory from a particular pool, deallocateObj( ) should return it to the same pool.
  Object status query
    virtual OC_Boolean isObjModified(OC_Object* obj);
    Returns OC_true if*obj is marked modified;returns OC_false otherwise. See the description of markObjModified( ) below.
    If the object's self ref is not recognized as valid, isObjModified( ) raises an OC_NoSuchRef exception.
    This pure virtual function is called by OC_Object::isModified( ), and by
      OC_Entity::isEntityModified( ) if the OC_Entity is an OC_Object.

Object manipulation virtual void putObj(OC_Object* obj);

Puts the current, in-memory state of obj to the database.

If the object's self ref is not recognized as valid, putObj( ) raises an OC_NoSuchRef exception. If the object has been persistently deleted, putObj( ) raises an OC_ObjectWasDeleted exception. If acquiring a lock on the referent causes the application's current transaction to wait for another transaction to commit, putObj( ) raises an OC_WaitException exception. If acquiring a lock on the referent causes the transaction to be aborted, pujObj( ) raises an OC_TransactionWas-Aborted exception. If putObj( ) is called outside any transaction, it raises an OC_NoTransaction exception.

Note that during the transaction in which they are made, all changes to the persistent state of an object with putObj( ) must be made visible only within the context of that transaction. If the transaction is successfully checkpointed or committed, you should then make the changes visible to subsequent transactions. If the transaction is aborted, you should discard all changes to the persistent states of objects made during the transaction.

virtual void deleteObj(OC_Object* obj);

Deletes *obj from the database.

If *obj's self reference value is not recognized as valid, deleteObj( ) raises an OC_NoSuchRef exception. If acquiring a lock on the referent causes the application's current transaction to wait for another transaction to commit, deleteObj( ) raises an OC_Wait-Exception exception. If acquiring a lock on the referent causes the transaction to be aborted, deleteObj( ) raises an OC_TransactionWasAborted exception.

This function is called by OC_Object::deleteObject( ).

virtual void destroyObj(OC_Object* obj);

Prepares *obj for deallocation from memory. If aborted is set to OC_true, destroy( ) has been called as a result of an exception handler abort. This method should not be called directly except from this class's destructor or from the destroy( ) function of derived classes.

This function is called by OC_Object::destroy( ).

virtual void markObjModified(OC_Object* obj);

Marks *obj as having been modified.

This pure virtual function is called by OC_Object::markModified( ). See the Reference Manual, Volume 1: Class Library for suggestions on using the OC_Object member functions markModified( ), unmarkModified( ), and isModified( ) in an optional modification-flagging scheme.

virtual void unmarkObjModified(OC_Object* obj);

Unsets the modified flag set on *obj by markObjModified( ), described above.

This function is called by OC_Object::unmarkModified( ).

Helper functions

These implemented object handling functions are available to be called by functions implemented by the storage management developer.

Object activation

```
OC_Object* defaultActiveObj (OC_Object* obj,
    OC_Type* theType, unsigned long objSelfRef);
```

Performs the final processing required to activate *obj, which is a memory location for an object that is initialized but inactive. The argument theType must point to the OC_Type for the object. The objSelfRef argument must be the self ref for the object to be activated.

The processing performed by defaultActivateObj( ) includes the location and invocation of the activation constructor wrapper function, vtbl simulation for instances of OC_Types that do not have an available vtbl, and initialization of storage manager and self ref values for *obj.

This function is usually called toward the end of the OC_StorageManager::getReferent( ) function Hash key retrieval virtual unsigned long getObjHashKey(OC_Object* obj);

Finds, calculates, or generates the hash key value for *obj. This value is used for hashing the object when it serves as a key to an aggregate, such as an unordered OC_Dictionary, or as a member of an OC_Set.

This function is called by OC_Object::getEntityHashKey( ).

If you refine getObjHashKey( ), you should adhere to the following basic guidelines:

getObjHashKey( ) should always return the same value for a particular object; this requirement pertains to the lifetime of the object.

For the best performance, you should minimize the probability that multiple objects have hash keys with the same values for their low-order bits. To that end, the hash values associated with n objects to be hashed by an OC_Aggregate should yield an even distribution of results from the formula modulo $2^m$ where m is the smallest positive integer such that $2^{m+3} > n$ where n is the hash key value.

Entity initialization

```
void initializeEntityPiece (OC_Entity* ent,
    unsigned long refVal);
```

Sets the ref val for *ent to the refVal argument, and sets *ent's storage manager to this one.

You may wish to use this function in implementations of allocateObj( ) and getReferent. However, you may find initializeInstance( ) and defaultActivateObj( ) more useful, as they subsume the functionality of initializeEntityPiece( ).

```
void initializeInstance (unsigned long refValue,
    char* startOfInstance, OC_Type* entType);
```

Updates all self reference value and storage manager values for all inherited and embedded objects in an object upon its creation or activation.

You may wish to use this function in implementations of OC_StorageManager::allocateObj( ) and OC_StorageManager::getReferent( ). However, you may find defaultActivateObj( ) more useful, as it subsumes the functionality of initializeInstance( ).

OC_Primitive memory allocation

```
virtual void* allocatePrim (long sz, OC_Type* theType,
    OC_Object* where, OC_Clustering howNear);
```

Returns a pointer to the memory it allocates for an OC_Primitive object. The sz argument is the number of bytes to allocate, and theType is the type of the object. The where and howNear arguments specify the clustering object and proximity, respectively.

This function is called by OC_Primitive::operator new( ).

virtual void deallocatePrim(void* prim);

Deallocates the memory pointed to by prim, which is an OC_Primitive or portion of an OC_Primitive object.

This function is called by OC_Primitive::operator delete( ). If you refine deallocatePrim( ), make sure that its implementation is compatible with that of allocatePrim( ).

IMPLEMENTING REFERENCE HANDLING

Reference handling support
  Overview
  Reference handling is a one of the most important storage management feature areas. This chapter describes basic reference handling, in which the OC_Reference and its referent belong to the same storage manager. Chapter 5, "Implementing inter-SM reference translation and export," addresses inter-storage manager reference handling, in which the referent's storage manager is different from the OC_Reference's.
  An in-memory reference can refer either to an in-memory or a persistent object. A persistent reference can refer only to a persistent object.
Reference values
  Reference values and self reference values
  Every instance of an OC_Entity-derived class has a property that is referred to as its self-reference, or self ref. This property identifies the entity to itself, in its in-memory state, for the duration off a client cache. Every OC_Reference instance has a similar property that is referred to as its reference value, or ref val. That property identifies the referent to the OC_Reference for the duration of the client cache.
  Every OC_StorageManager instance initializes and maintains a set of self reference values that represents all the entities managed by that storage manager. Every OC_StorageManager instance also initializes and maintains a set of reference values that represents all the OC_References that reference all the entities managed by the storage manager.
  Each OC_StorageManager instance is responsible for the method of translating its reference values to pointers to their corresponding entities, and for maintaining this reference value-to-referent mapping for the duration of the client cache.
  Each storage manager is also responsible for mapping its reference values to the status of each object it manages. The status referred to encompasses the results of such OC_StorageManager query functions as is Obj-Modified( ) and isReferentInDB( ).
  The reference space
  Both the reference value and the self reference value properties are 32-bit(unsigned long) structures, of which eight bits are reserved for ONTOS DB use and 24 bits are available for use by the reference's storage manager. The storage manager's portion of the reference value or self reference value is called its reference space and can contain $2^{24}$ (about 16 million) different values to map to entities. FIG. 4-1 illustrates the reference value or self reference value structure.

| 8 bits; reserved for ONTOS DB | 24-bit reference space; value set by storage manager |
|---|---|

FIG. 4-1 32 bit reference value (in OC_Reference) or self reference value (in OC_Entity)

For developer-derived OC_StorageManager subclasses, this structure also applies to the persistent state of the object. In the future, OC_StorageManager may represent persistent reference values in a different way.

Control of reference values
  For intra-storage manager references, reference values for persistent OC_References are controlled by the OC_Reference's storage manager (which is also the referent's storage manager). However, reference values for in-memory OC_References are always the same as the referent's self reference value.
  Control of reference values for inter-storage manager references differs somewhat from this scheme. Chapter 5, "Implementing inter-SM reference translation and export," compares intra-SM references with inter-storage manager references.

Reference handling functions
  Class OC_Reference has a number of functions that are implemented to call corresponding functions on the OC_StorageManager subclass instance that manages the OC_Reference. OC_StorageManager's basic reference handling functions include functions to query the status of an OC_Reference's referent and manipulation functions to change the status of an OC_Reference or its referent.
  Unimplemented functions
  All-reference handling member functions are defined as pure virtual on OC_StorageManager, so that the storage management developer must implement them for any subclass, according to their specifications.
  Referent status query virtual  OC_Boolean  isReferentActive(OC_Reference*ref);

Returns OC_true if *ref's referent is active; returns OC_false otherwise. If the reference's value is not recognized as valid, isReferentActive( ) raises an OC_NoSuchRef exception.

This function is called by OC_Reference::isActive( ) and OC_Reference::getActiveReferent( ).

virtual OC_Boolean isReferentDeleted(OC_Reference* ref);

Returns OC_true if ref's referent has been persistently deleted; returns OC_false otherwise. If the reference's value is not recognized as valid, isReferentDeleted( ) raises an OC_NoSuchRef exception.

This function is called by OC_Reference::isReferentDeleted( ) and OC_Object::isObjectDeleted( ), and by OC_Entity::isEntityDeleted( ) if the instance is an OC_Object.

virtual OC_Boolean isReferentInDB(OC_Reference* ref);

Returns OC_true if *ref's referent has ever been put to the database (and has not been persistently deleted). The function returns OC_false otherwise. If the reference's value is not recognized as valid, isReferentInDB( ) raises an OC_NoSuchRef exception.

This function is called by OC_Reference::isInDB( ) and OC_Object::isObjectInDB( ), and by OC_Entity::isEntityInDB( ) if the instance is an OC_Object.

virtual OC_Boolean isReferentNew(OC_Reference* ref);

Returns OC_true if *ref's referent was created in the current cache (and has not been persistently deleted). The function returns OC_false otherwise. If the reference's value is not recognized as valid, isReferentNew( ) raises an OC_NoSuchRef exception.

This function is called by OC_Reference::isNew( ) and OC_Object::isObjectNew( ), and by OC_Entity::isEntityNew( ) if the instance is an OC_Object.

Referent retrieval functions virtual OC_Entity* getReferent(OC_Reference* ref, OC_LockType lock);

Returns a pointer to *ref's referent, whether or not the referent is currently active. If necessary, get-Referent( ) activates the referent, locking it with lock type lock.

The following table shows the exceptions that may be raised by getReferent( ) and the conditions that cause them to be raised.

| Exception raised | Condition |
| --- | --- |
| OC_NoSuchRef | Reference value is not recognized as valid. |
| OC_ObjectWasDeleted | Referent has been persistently deleted. |
| OC_WaitException | Acquiring a lock on the referent causes the application's current transaction to wait for another transaction to commit. |
| OC_TransactionWasAborted | Acquiring a lock on the referent causes the transaction to be aborted |

This function is called by OC_Reference::getReferent( ).

virtual OC_Entity* getReferentIfActive(OC_Reference* ref);

Returns a pointer to *ref's referent if *ref has a referent that is active; returns 0 otherwise. If the reference's value is not recognized as valid, get-ReferentIfActive( ) raises an OC_NoSuchRef exception.

This function is called by the following OC_Reference member functions: isReferentModified( ), getReferent-IfActive( ), and getActiveReferent( ).

Lock function

| virtual OC_LockType getReferentLockType (OC_Reference* ref); |
| --- |

Returns *ref's lock type. If the reference's value is not recognized as valid, getReferentLockType( ) raises an OC_NoSuchRef exception.

This pure virtual function is called by OC_Reference::getReferentLockType( ) and OC_Object::getLock-Type( ), and by OC_Entity::getEntityLockType( ) if the instance is an OC_Object.

| virtual void lockReferent (OC_Reference* ref, OC_LockType lock); |
| --- |

Acquires or upgrades a lock of OC_LockType lock on the referent of *ref. If the reference's value is not recognized as valid, lockReferent( ) raises an OC_NoSuchRef exception.

This function is called by OC_Reference::lockReferent and OC_Object::lockObject( ), and by OC_Entity::lockEntity( ) if the instance is an OC_Object.

Reference manipulation function

| virtual void discardReference (OC_Reference* ref, OC_Boolean persistently); |
| --- |

Discards the reference value of *ref, setting it to 0. Passing a persistently argument of OC_true causes discardReference( ) to free all resources associated with all persistent references to the referent. All resources associated with in-memory references to the referent are freed, regardless of the persistently argument.

If the reference's value is not recognized as valid, discardReference( ) raises an OC_NoSuchRef exception.

The discardReference( ) function must be called only for reference values that are no longer used by any OC_Reference. If the reference is outbound (that is, the referent's storage manager is different from the OC_-Reference's), discardReference( ) discards the reference value used by the referent's storage manager before discarding that used by the reference's storage manager.

If an application does not call this function after a referent is deallocated or persistently deleted, the storage manager continues to associate the reference value with the referent. This default behavior guards against dangling and ambiguous references by preventing reuse of a reference value for any other object. One disadvantage of this behavior is the overhead it requires to maintain support for reference values that are no longer in use. Another is the limit it imposes of $2^{24}$ (about 16 million) referents per cache duration per storage manager. By informing the storage manager that the current reference value is no longer in use, a call to discardReference( ) eliminates these drawbacks and enables reuse of the 24-bit reference space portion of the reference value.

Caution: Be careful not to call discardReference( ) with a *ref argument that has the same value as another OC_-Reference that might be used later by the application.

Helper functions

These implemented functions are available to be called by functions implemented by the storage management developer.

self reference value retrieval static unsigned long getEntSelfRefValue(OC_Entity* ent);

Returns the self reference value of *ent. Since self reference values are useful as keys to data structures defined and maintained by storage managers, storage manager developers can use this function in OC_Object- and OC_Reference-related query and update functions.

Referent retrieval

| virtual OC_Argument getReferentAsArgument (OC_Reference* ref); |
| --- |

Returns *ref's referent as an OC_Argument. If the referent is stored as type char* or int, the returned OC_Argument is initialized directly with that value.

The purpose of this function is to convert reference values to OC_Arguments without the overhead of using OC_Primitive-derived classes.

The following table shows the exceptions that may be raised by getReferentAsArgument( ) and the conditions that cause them to be raised.

| Exception raised | Condition |
| --- | --- |
| OC_NoSuchRef | Reference's value is not recognized as valid. |
| OC_ObjectWasDeleted | Referent has been persistently deleted. |
| OC_WaitException | Acquiring a lock on the referent causes the application's current transaction to wait for another transaction to commit. |
| OC_TransactionWasAborted | Acquiring a lock on the referent causes the transaction to be aborted. |

IMPLEMENTING INTER-SM REFERENCE TRANSLATION AND EXPORT

Inter-SM reference translation and export support
  Overview

Every storage manager must be able to translate, into its own reference space, the persistent and non-persistent OC_References to objects under the control of other storage managers. A storage manager must also handle export of OC_References to its own objects and to objects under the control of other storage managers.

The inter-storage manager reference translation and export functions, defined on OC_StorageManager, enable objects controlled by different storage managers to reference each other. Without this reference translation and export interface, you would be able to use only one storage manager instance per physical database.

REFERENCE VALUES FOR INTER-SM REFERENCES

Chapter 4, "Implementing reference handling," describes the 32-bit reference value structure. This structure is also used for inter-storage manager reference values.

However, the reference values for inter-storage manager references are always controlled by the OC_Reference's storage manager, whether the reference is in-memory or persistent. Recall that for intra-storage manager references, reference values for persistent OC-References are also controlled by the OC_Reference's storage manager (which is also the referent's storage manager), but reference values for in-memory OC_References are always the same as the referent's self reference value.

Resolution of inter-SM references

Resolution of inter-storage manager references is based on a two-tiered architecture, which facilitates the resolution of references that have been previously translated by one or more other storage managers. With the two-tiered architecture, a storage manager given a reference also receives a record of the referent's original reference value and the identity of its storage manager, no matter how many intervening translations into other storage managers' reference spaces have occurred.

Functions for inter-SM reference translation and export

The OC_StorageManager's inter-storage manager translation interface includes functions that translate OC_References referring to objects handled by other storage manager instances and that export OC_References to other storage manager instances.

Unimplemented functions

These inter-storage manager reference translation/export functions are pure virtual, so must be implemented by the storage management developer:

```
virtual unsigned long translateRefValue (
    OC_Entity* referent);
```

Returns an in-memory reference value for *referent, which belongs to a storage manager other than this one.

After the call to translateRefValue( ), this OC_StorageManager recognizes the translateRefValue( ) return as an outbound reference, that is, as a reference to *referent as an OC_Entity under the control of another storage manager.

Note that the reference value should encode the storage manager originating the reference, as well as the self reference value of *referent.

Consequently, the translateRefValue( ) implementation is independent of the storage managers in existence at a particular time.

This function is called by OC_Reference::reset( ), OC_Reference::init( ), and the OC_Reference constructor, when the referent's storage manager is different from the OC_Reference's.

```
virtual unsigned long translateRefValue (
    unsigned long oldRefValue,
    OC_StorageManager* oldContext);
```

***Returns a reference value that is either an outbound reference, or a reference originating from this storage manager that was translated by another storage manager and then passed back to this storage manager. The oldRefValue argument is the reference value to translate. The oldContext argument points to the storage manager for oldRefValue (oldContext is never this).

If oldRefValue is not recognized as valid in the context of oldContext, translateRefValue( ) raises an OC_NoSuch-Ref exception.

Note that the reference value returned must indicate the storage manager originating the reference, as well as old-RefValue. Consequently, the translateRefValue( ) implementation is independent of other storage managers' implementations that exist at a particular time.

This function is called by OC_Reference::reset( ), OC_Reference::init( ), and the OC_Reference constructor, when *oldContext is different from the OC_Reference's storage manager.

```
virtual OC_Boolean compareReferences (OC_Reference* r1,
    oc_Reference* r2);
```

Returns OC_true if r1 and r2 have referents that are the same or equal; returns OC_false otherwise. If either reference's value is invalid, compareReferences( ) raises an OC_NoSuchRef exception.

This function is called by OC_Reference::compare( ).

Helper functions

These implemented inter-storage manager reference translation/export functions perform complex processing that is common to most OC_StorageManager-based classes. They are available for use in implementing the functions described above.

```
virtual OC_Boolean simplifyRefValue (
    unsigned long& simpleRefValue,
    OC_StorageManager*& simpleSM);
```

Translates a reference value into the form associated with the storage manager that originated it. The reference is now managed by this storage manager but may have previously been managed by another storage manager. Pass the reference value as the simpleRefValue argue-ment, and pass a pointer to this storage manager (assigned to this) as simpleSM. The function returns $OC_{13}$ true if the reference value originated with another storage manager. In that case, it returns a pointer to the originating storage manager in simpleSM, and the simplified reference value in simpleRefValue (which may coincidentally be the same value that was passed in).

Note:
The following three functions are not yet available for use. Their descriptions are included here for completeness.

```
virtual void makePersistentReference (
    unsigned long refValue, OC_StorageManager* referencer,
    OC_PersistentReference& toBeSet);
```

This function is not available with ONTOS DB Release 3.1. It is specified to translate the in-memory reference value refValue into a persistent reference toBeSet, with storage manager *referencer.

```
virtual OC_Boolean replacePersistentReference (
    const OC_PersistentReference& oldValue,
    const OC_PersistentReference& newValue,
    OC_StorageManager* owner);
```

This function is not available with ONTOS DB Release 3.1. It is specified to return. OC_true if replacePersistentReference( ) has unconditionally replaced oldValue with newValue. The owner argument points to the storage manager for both oldValue and newValue.

```
virtual unsigned long resolvePersistentReference (
    const OC_PersistentReference& toBeResolved,
    OC_StorageManager* referencer);
```

This function is not available with ONTOS DB Release 3.1. It is specified to return the reference value of an in-memory reference, managed by storage manager *referencer, for the same referent as the persistent reference toBeResolved.

IMPLEMENTING ITERATION AND INDEXING

Iteration and indexing support
Overview
Every OC_StorageManager subclass provides support for processing objects as instances of OC_Types with extensions and as instances of OC_Types with indexed properties. For more information about extensions and indexed properties, see the Developer's Guide and the entries for the OC_Property and OC_Type classes in the Reference Manual, Volume 1:Class Library.

The storage management developer can implement OC_-StorageManager functions to achieve greater efficiency in iteration and indexing than is offered by the OC_-StandardSM and OC_Group classes. This section describes two supporting features, subextensions and subindexes, and how to use them. The section also discusses providing storage management support for operations involving common and specialized subextensions and indexes.

Completeness and uniqueness
Completeness of iteration over extensions and indexes
Objects with storage managers that are not in the currently open logical database do not participate in iterations over their extensions and indexes. Therefore, in order to extend any processing to all instances of a type, you must store all those instances, as well as all their storage managers, in a single logical data-base.

Qualified global uniqueness for indexed properties
Because objects with storage managers not in the currently open logical database do not participate in iteration over their indexes, uniqueness of values for indexed properties is guaranteed only for objects belonging to storage managers that are in the currently open logical database. This consequence is called qualified global uniqueness.

When an area containing a storage manager to the current database, there is a possibility that one or more objects in the added area have values that duplicate those of objects already in the database. This dupli-cation violates the uniqueness constraint for those properties defined as unique.

Because the duplication does not arise often, ONTOS DB takes an optimistic approach and leaves detection and correction of the condition to the application. If such duplications could be detrimental to an application, the application should include code to detect and correct the problem wherever it might occur. The following example is suggested as a basis for such code:

```
void checkIndexesOnType (OC_Type* theType)
{
    OC_Object* suspectInstance;
    OC_Iterator* theIter = theType→getIterator
    (OC_read-Lock);
    while (suspectInstance = (OC_Object*)theIter→yield-
EntityValue ( ) )
    {
        OC_StorageManager::checkAllIndexes (suspectInstance);
    }
}
```

The subextension feature
Common and specialized subextensions
ONTOS DB transparently partitions every extension into subextensions, each comprising objects belonging to a single storage manager. The subextension feature enables storage management developers to implement specialized subextension treatments for particular storage managers. Many storage managers are well served by the default, common subextension implementation provided by ONTOS DB. However, for a particular custom storage manager, a specialized subextension might give more accurate results and better performance.
Note:
An instance can be a member of only one subexten-sion (common or specialized) on its direct type, if the direct type has an extension. The instance can also be a member of only one subextension on each of its direct type's supertypes that have extensions.
When to use a specialized subextension
A custom iterator can be advantageous for a storage manager that accesses many objects as a single opera-tion. Consider, for example, a storage manager that supports specialized functions that identify a large number of objects, likely to be requested within a short period of time, and access them all at once. Iteration of that storage manager's subextension would be faster than the default iteration, which uses references to individual objects in order to access them one at a time.
Implementing specialized subextensions
To implement a specialized subextension, you must derive an iterator class from class OC_Iterator. Implement your class's member functions to most effectively iterate over the objects belonging to the storage manager. Also, implement the getIterator( ) functions (three signatures) for your storage manager class, so each returns a pointer to an instance of the specialized iterator class.

The result of the implementation is that when an application uses the iterator returned by OC_Type::get-Iterator( ) to iterate over the type's extension, ONTOS DB calls getIterator( ) on the storage manager for each subextension. ONTOS DB uses the returned iterator to yield the objects belonging to that storage manager.

Temporary subextension for new objects

ONTOS DB also defines a special, temporary subextension, in which it automatically includes all newly created, unsaved objects, regardless of the storage managers they belong. An iteration over an extension includes iteration over the temporary subextension.

Because the temporary subextension includes all new objects, you should implement all specialized sub-extensions to exclude new objects.

The subindex feature
Description

Property indexes are divided into subindexes, each managed by a different storage manager instance. Since different storage managers and their objects can be stored in different database areas, subindexing supports restriction of access through iteration, to those objects that are stored in areas in the current logical database.

The subindex feature enables storage management developers to implement specialized subindex treatments for particular storage managers. Many storage managers are well served by the default, common subindex implementation provided by ONTOS DB. However, for a particular custom storage manager, a specialized subindex might give more accurate results and better performance.

Note:
An instance of an OC_Type should be a member of only one subindex (common or specialized) per index for each of the type's indexed properties.

Implementing specialized subindexes

To implement a specialized subindex, you must derive an iterator class from class OC_Iterator. Implement your class's member functions to most effectively iterate over the objects belonging to the storage manager for the subindex. Also, implement the getIterator( ) functions (three signatures) for your storage manager class, so each returns a pointer to an instance of the specialized iterator class.

The result of the implementation is that when an application uses the iterator returned by OC_Type::get-Iterator( ) to iterate over the type's subindex, ONTOS DB calls getIterator( ) on the storage manager for each subindex. ONTOS DB uses the returned iterator to yield the objects belonging to that storage manager.

Operations with Common Subextensions and Common Subindexes

Storage managers that do not provide specialized subextensions for all subextensions or all subindexes must provide support for several operations that deal, respectively, with common subextensions or common subindexes. OC_StorageManager defines helper functions, described in the following subsection, for these operations.

A storage manager is responsible for adding an instance, as required, to the common subextensions and common subindexes when the instance is created, and for updating the instance's indexes when it is put to the database. The storage manager is also responsible for removing the instance from extensions and indexes when the instance is deleted. To support these operations, OC_StorageManager has the helper functions described under "Common subextension membership" on page 6–8 and "Common subindex membership" on page 6–9.

There are pairs of complementary helper functions for adding instances to, and removing them from, common subextensions and common indexes.

For extensions, one function in the pair applies only to extensions on the given type, and the other applies to the direct type of the given object and to the type's supertypes. Unless the storage manager is using specialized subextensions on one or more types in the object's type hierarchy, you should use the second variant in each of these pairs of functions.

An example of a pair of complementary extension-related helper functions is addToCommonExtension( ) and addToAllCommonExtensions( ). The addToCommonExtension( ) function adds the instance only to the extension on the given type. The addToAllCommonExtensions( ) function adds the instance to its direct type's common subextension and to the common subextensions for all the type's super-types.

For indexes, one variation on the add or remove function affects only the given indexed property (for example, addToCommonIndex( )) and the other affects all indexed properties (for example, addToAllCommonIndexes( )).

Iteration over Subextensions and Subindexes

OC_StorageManager supports operations that deal with participation in iteration of subextensions and subindexes, through a number of helper functions described in the subsection.

For efficiency, OC_IndexIterator functions call the OC_StorageManager::getIterator( ) function on only those storage managers that are enabled as participants in the iteration of the subextension or subindex. Most storage managers are enabled as participants in a specialized iteration, as required, when they are created or activated; they should also be disabled as participants when they are deleted.

The unimplemented functions described under "Sub-extension iteration participation" on page 6–9 and "Subindex iteration participation" on page 6–9 must be implemented to enable and disable participation in iteration of subextensions and subindexes, respectively. Those subsections also describe query functions for ONTOS DB code to determine whether the storage manager is a participant in the iteration.

Functions for Iteration and Indexing
Unimplemented Functions

The iteration and indexing functions are pure virtual, so must be implemented by the storage management developer.

Iterator retrieval virtual OC_Iterator* getIterator(OC_Type* theType, OC_LockType lock);

Returns a pointer to an OC_Iterator for this storage manager's subextension of *theType's extension. Use the lock argument to specify the lock type for instances that are activated by iteration.

virtual OC_Iterator* getIterator(OC_Type* theType, OC_-Property* prop* OC_Argument value, OC_LockType lock);

virtual OC_Iterator* getIterator(OC_Type* theType, OC_-Property* theProp, OC_Argument start, OC_Argument end, OC_-Boolean yieldInOrder, OC_LockType lock);

Returns a pointer to an OC_Iterator for this storage manager's subindex of property *theProp on *theType. For the first overload, the returned iterator yields instances with property values that are equal to the value of value. For the second overload, the iterator yields instances with property values in the range specified by start and end.

For the last of the three getIterator( ) overloads, a yieldInOrder argument of OC_true specifies that the returned iterator yield instances in ascending values for *prop;setting yieldInOrder to OC_false means that the yield order is undetermined. The lock argument specifies the lock type for instances activated by iteration.

The three getIterator( ) functions are called by the OC_InstanceIterator member functions. They are called only on storage managers that have been enabled as iteration or index participants for the specified OC_Type or OC_Property, respectively. This scheme is based on the assumption that a storage manager that is not enabled as a participant either has no instances of the specified OC_Type or has added all the instances to the common subextension and indexes for the OC_Type.

Instance count query virtual unsigned long getInstanceCount(OC_Type* theType);

Returns an approximate number of instances of *theType that belong to this storage manager, if it uses a specialized subextension. If neither *theType nor any of its supertypes has an extension, or if this storage manager uses the common subextension, getInstanceCount( ) returns 0.

This function is called by OC_Type::numInstances( ), only on storage managers enabled as iteration participants for *theType.

Helper functions

These implemented functions for iteration and indexing perform complex procesing that is common to most OC_StorageManagerbased classes. They are available for use in implementing object operations.

Common subextension membership

These functions add objects to and remove them from the common subextension for a type.

staticvoidaddToCommonExtension(OC_Type,theType, OC_-Object* theObj);

Adds *theObj to the common subextension for *theType.

static void addToAllCommonExtensions(OC_Object, theObj);

Adds *theObj to its direct type's common subextension and to the common subextensions for all the OC_Type's supertypes.

static void removeFromCommonExtension (OC_Type* theType, OC_Object* theObj);

Removes *theObj from the common subextension for *theType.

static void removeFromAllCommonExtensions (OC_Object* theObj);

Removes *theObj from its OC_Type's common subextension and from the common subextensions for all the OC_Type's supertypes.

Common subindex membership static void addToCommonIndex (OC_Type* theType, OC_Property* theProp, OC_Object* theObj);

Adds *theObj to the common subindex for the indexed property *theProp. The *theType argument is ignored.

static void addToAllCommonIndexes(OC_Object, theObj);

Adds *theObj to all common subindexes for all the indexed properties for *theObj.

static void removeFromCommonIndex (OC_Type* theType, OC_Property* theProp, OC_Object* theObj);

Removes *theObj from the common subindex for the indexed property *theProp. The *theType argument is ignored.

static void removeFromAllCommonIndexes(OC_Object, theObj);

Removes *theObj from all common subindexes for all the indexed properties for *theObj.

static void updateCommonIndex (OC_Type* theType, OC_Property* theProp, OC_Object* theObj);

Updates *theObj in the common subindex for the indexed property *theProp. Updating involves adding current index entries and removing entries that are no longer used. The *theType argument is ignored.

static void updateAllCommonIndexes(OC_Object* theObj);

Updates *theObj in all common subindexes for all the indexed properties for *theObj. Updating involves adding current index entries and removing entries that are no longer used.

static void checkAllIndexes(OC_Object* theObj);

Checks for uniqueness the indexes for all unique properties on *theObj. If checkAllIndexes( ) finds a nonunique value, it raises an OC_NotUnique exception.

Subextension iteration participation

OC_Boolean isIterationParticipant(OC_Type* theType);

Returns OC_true if this storage manager is a participant in iteration over a specialized subextension for *theType; returns OC_false otherwise.

OC_InstanceIterator functions call the OC_StorageManager::getIterator( ) functions on only those storage managers that are enabled as participants in the iteration.

void enableIterationParticipation(OC_Type* theType);

Enables this storage manager as a participant in iteration for *theType. For efficiency, OC_Instance-Iterator functions call the OC_StorageManager::get-Iterator( ) function on only those storage managers that are enabled as participants in the iteration.

void disableIterationParticipation(OC_Type* theType);

Disables this storage manager as a participant in specialized subextension iteration for *theType. OC_InstanceIterator functions call the OC_Storage-Manager::getIterator( ) function on only those storage managers that are enabled as participants in the iteration.

Subindex iteration participation

OC_Boolean isIndexParticipant (OC_Type* theType, OC_Property* theProp);

Returns OC_true if this storage manager is a participant in iteration over a specialized subindex for property *theProp on type *theType. It returns OC_false otherwise.

OC_IndexIterator functions call the OC_Storage-Manager::getIterator( ) function on only those storage managers that are enabled as participants in iteration over a specialized subindex for the property.

```
void enableIndexParticipation (OC_Type* theType,
    OC_Property* theProp, OC_Boolean ordered,
    OC_Boolean isUnique);
```

Enables this storage manager as a participant in iteration over a specialized subindex for property *theProp on type *theType. If *theProp does not have an index, enableIndexParticipation( ) creates one, making it ordered if ordered is OC_true and unique if isUnique is OC_true.

Call enableIndexParticipation( ) for each property for which this storage manager implements a specialized subindex.

```
void disableParticipation (OC_Type* theType,
    OC_Property* theProp);
```

Disables this storage manager as a participant in iteration over the specialized subindex for property *theProp on type *theType.

IMPLEMENTING TRANSACTION AND CACHE HANDLING

Transaction and cache handling support
  Overview
Every OC_StorageManager subclass must provide the processing that needs to take place before and after transaction and cache handling operations occur. The storage manager developer is responsible for identifying the tasks, if any, that the storage manager's trans-action and cache handling functions need to perform.
  Concurrent object ID allocation
At a site that needs to support simultaneous object creation by concurrent applications, the applications must create and use an OC_OIDSpace object to manage the allocation of object IDs(OIDs). The OC_OIDSpace class enables concurrent allocation of OIDs without risk of duplication.

Class OC_OIDSpace is described in the *Reference Manual, Volume 1: Class Library*. As that manual states, the application must activate the OC_OIDSpace object with an OC_LockType of OC_instantUpdateLock. The application must also call putObject( ) on the OC_OIDSpace immediately after its use.
  Storage manager deallocation
An OC_StorageManager instance should never be deallo-cated from memory while any of the objects it manages are in memory. The "Storage management" chapter of the *Developer's Guide* informs application developers about this restriction.
Functions for transaction and cache handling
The transaction and cache handling functions are all called by related Client Library free functions, which have names similar to the OC_StorageManager functions. An example is the function OC_StorageManager::start-Transaction( ). At the end of its processing, OC_-transactionStart( ) calls startTransaction( ) on each active instance of an OC_StorageManager class.

Application code may also call these functions where required.
  Unimplemented functions
These functions are all pure virtual, so must be implemented by the storage management developer.
  Transaction handling
    virtual void startTransaction( );

This function is called on each active storage manager at the end of OC_transactionStart( ).

Usually, after a new transaction is started, the application must construct the storage managers needed to manage its objects. However, one or more storage managers may already exist when the transaction starts. A storage manager can exist because the preceding transaction was ended with an OC_keepCache setting, or because the storage manager was created outside the scope of any transaction.

OC_StorageManager::startTransaction( ) processing must be performed for each storage manager, whether or not the storage manager exists at the start of the transaction. Also, the startTransaction( ) processing should be performed only once per transaction for each object. You can satisfy these requirements by using the following approach:

1. Define a function on each storage manager class to perform the processing that startTransaction( ) must perform. The function might be called startXAProcessing( ), for example. (Alternatively, you could give each class a different function with the same purpose.)
2. For each class, implement the startXAProcessing( ) function described in Step 1.
3. Implement startTransaction( ) as a pass-through function, whose only action is to call the startXAProcessing( ) function.
4. Code the storage manager class's constructor to include a call to startXAProcessing( ).

Following these steps results in identical processing for each storage manager, whether it exists at the transaction's start or is created during the transaction.

virtual void abortTransaction( );

This function is called on each active storage manager at the beginning of OC_transactionAbort( ).

virtual void checkpointTransaction( );

This function is called on each active storage manager at the beginning of OC_transactionCheckpoint( ).

virtual void commitTransaction( );

This function is called on each active storage manager at the beginning of OC_transactionCommit( ).
  Cache handling
    virtual void cleanCache( );

If the cache disposition is set to OC_cleanCache, cleanCache( ) is called on each active storage manager during execution of OC_transactionCommit( ) or OC_trans-actionAbort( ), as part of the cache cleaning operation.
  Database close
    virtual void closeDatabase( );

This function is called on each active storage manager at the beginning of OC_close( ).

ADMINISTERING STORAGE MANAGEMENT FACILITIES

Task overview
The role of storage management administrator encompasses management of the tasks of creating, configuring, using, and deleting storage managers. (Bear in mind that the term "storage manager" refers to an instance of an OC_-StorageManager-based class.) For some storage management facilities, these tasks also pertain to instances of related, component classes.

Management of the configuration and use of storage managers is specific to the particular OC_StorageManager class and the storage management facility in which it serves.

Therefore, this guide does not address issues of storage manager configuration and use. There are, however, some points that you should consider in the creation and deletion of all storage managers; these are addressed in the following two sections.

When to create a storage manager

Determining storage manager scope and number

The decision on when to create a new storage manager is strongly influenced by two factors: the scope of the prospective storage manager (the number of objects that can belong to it) and the number of storage managers that can exist concurrently.

These two factors are interdependent: the greater a storage manager's scope, the fewer of them are needed, and vice versa.

Each OC_StorageManager-based class has to make its own trade-offs regarding scope and number. Following are some considerations to take into account when determining the scope and number of storage managers.

Reference space

One limitation affecting both the scope and the number is the storage manager's reference spaces, as defined by their OC_Reference reference value structures.

If you plan to use multiple storage managers, scope is affected by the amount of interstorage manager referencing that will be required. A small data set, for which the number of objects is expected to be much smaller than the number of usable references in a storage manager's reference space, is a strong candidate for association with a single storage manager. Note that the usable reference space of a particular storage manager may be limited to significantly less than the theoretical maximum imposed by the OC_Reference structure. This limitation may be introduced whenever a storage manager class imposes partitionings, structures, or orders on its reference spaces.

The primary motivation in limiting the number of storage managers is usually the amount of processing required to handle inter-storage manager references. If a potentially large data set can easily be separated into two or more parts such that references from one part to another are rarely used, there is a strong case for creating the objects in each part with a different storage manager instance.

Resource limitations

Occasionally, the number of storage managers is limited by a particular storage manager's consumption of a great deal of memory or disk resources.

Performance of persistent, inter-SM references

An additional factor limiting the number of storage manager instances is ONTOSDB's current storage manager identification algorithm for support of persistent, inter-storage manager references. This algorithm stores a reference to each storage manager instance in an OC_List in the database's kernel area. The time and memory overhead involved in accessing an element in a large OC_List is roughly proportional to the position of the element in the OC_List. Therefore, it is possible to have some reduction in the efficiency of storage managers created after the creation of a great many others.

For most applications, the impact of this overhead is negligible. Only in an application that creates hundreds of storage managers would the effect be noticeable. Even in such an application, the impact is likely to be minimal, unless the application frequently accesses objects containing persistent, inter-storage manager references.

Caveats on deletion of storage managers

Do not deallocate from memory any OC_StorageManager-based class instance if there is the possibility that any objects belonging to it are still active.

Do not delete from the database any OC_StorageManager-based class instance if there is the possibility that any objects belonging to it still exist or are still referenced by other objects (active or inactive) belonging to other storage managers.

Results of attempts to violate either of these con-straints are undefined.

OC-StorageManager function

The following are OC_StorageManager implemented functions that support the tasks of the storage management administrator.

Constructors and destructor

OC_StorageManager(char* name=(char*) OC_null);

OC_StorageManager constructor, called from subclass constructors only. You may optionally specify a name for the storage manager with the argument name.

OC_StorageManager(OC_APL* theAPL);

OC_StorageManager activation constructor.

~OC_StorageManager( );

Administrative member functions void destroy(OC_Boolean aborted);

Prepares this storage manager for deallocation. If aborted is set to OC_true, destroy( ) has been called as a result of an exception handler abort. This method should not be called directly except from this class's destructor or from the destroy( ) function of derived classes.

unsigned short getAreaNumber( );

Returns the ID number of the kernel area for the open logical database.

virtual OC_Type* getDirectType( );

Returns a pointer to this storage manager's OC_Type.

unsigned short getID( );

Returns the unique ID for this OC_StorageManager instance.

Objects in the ODBMS 20 of the illustrative embodiment are units of data representing the objects (people, places, concepts, and other things) found in the application 10 domain. Objects have a type (what they are, such as a "baseball player"), which can be determined at run-time and usually have some type-appropriate data (metrics, colors, labels, descriptions, etc. like "name", "batting record", "height", "rookie year") , and some type-appropriate behavior (what they can do, what can be done with/to them "play ball", "strike out", "practice", "get traded"), associated therewith.

Object handling tasks, including reading and activating objects, and writing and putting objects to the data store, are implemented with object handling member functions. In the illustrative ONTOS DB, every object, upon instantiation, is assigned to a storage manager instance of the SM API based class. The associated storage manager instance is initially responsible for locating a suitable memory location for newly instantiated objects. The status of an object can be queried using functions in the object handling interface. An object's storage manager also includes functions for manipulating objects in memory or in the ODBMS. An object's storage manager effects the implementation of such object operations as activation, deactivation, deletion from the database, and deallocation.

As indicated hereinbefore, each object handled by the ODBMS in the illustrative embodiment is assigned to and managed by a storage manager instance of SM API 24. The storage manager must have a mechanism or reference by which it can refer to either an in-memory or persistent object. Thus, every object has a property or reference that refers to it. References are connections by which one object can be related to another. For example, an object representing a "baseball player" may have references that connect it with other objects such as those representing a "baseball team", "practice schedule", and/or "baseball uniform".

Iteration and indexing operations relate to the use of indices and extensions that facilitate fast access to objects based on their type and/or data. ODBM's typically include a mechanism to permit applications to iterate over objects in the database for processing. In ONTOS DB, as described in the referenced materials, indices and extensions are used to iterate over objects that are represented as instances of types in the database schema.

A type is a kind of object that defines the state, behavior and applicability of other entities, called its instances. Types specify an instance's (other object's) state in terms of its properties; dynamic behaviors in terms of its procedures; and means of constructing new instances. Types in ONTOS DB in the illustrative embodiment also provide information used in bringing instances of the Type into memory from disk and an optional iterator for accessing all the instances of the Type.

Similarly, indices, supported in typical ODBM's known in the art including ONTOS DB of the illustrative embodiment, allow fast access to objects when some of their data is known but their identities are not. For example, a structure listing each "ball player" in order by batting average, would allow fast access to the best and worst hitters in the league (the top and bottom of the listing). Extensions allow fast access to all objects of a known type regardless of their data. For example, a list of all "pitchers" would allow faster access to all of the pitchers than a list of all "ball players" or, worse yet, a huge list of all baseball-related objects, including "ball players", "teams", "team managers", "stadiums", etc Transactions are operations in the context of the object oriented database, effected by the ODBMS, in which individual modifications of the database are aggregated into a single large modification that either occurs in its entirety (is "committed"), or does not occur at all (is "aborted"). All client application database operations occur in transactions which are effected by the ODBMS, or ONTOS DB in the case of the illustrative embodiment.

In a typical ODBMS, transactions are referred to as an atomic set of operations on one or more objects. "Atomic" meaning that the operations within the transaction are treated as if they all happened or none of them happened. Continuing the "baseball player" example, each "ball game" may be associated with a transaction since either the game is held and all of the statistics for the teams and players in the game are updated accordingly, or the game is called off due to rain and the team and player records are ALL left unchanged.

The object handling, reference handling, indices and extensions, and transactions are typical ODBMS constructs that are accommodated by the SM API 24 in the modular, illustrative implementation described herein. It should be appreciated that the SM API 24 is not an absolute requirement, but is an aspect of ONTOS DB included in this illustrative embodiment. To practice the invention it is only necessary that the constructs and functions for manipulating the constructs of the typical ODBMS discussed hereinbefore be supported at the "front end" API of an external storage manager mechanism 26 according to the invention, discussed hereinafter. In this illustrative embodiment ONTOS DB provides such support in the form and functions of the SM API 24.

These constructs and the operations defined for manipulating these constructs provide the API or "front end" to the external storage manager mechanism 26. As this "front end" API is indistinguishable from the API to an object-oriented database programming system, the external storage manager mechanism 26 allows an application 10 to be developed in the normal object-oriented paradigm, as if all data were being transparently accessed from a true object-oriented database. In particular, the application developer need not be concerned with the interface requirements for each of the data storage facilities being accessed.

The functions comprising the SM API 24 in the illustrative embodiment invoke specialized external storage manager(s) 28, as discussed hereinafter, to meet particular requirements of external data stores 22 of a particular installation. Essentially, the external storage manager mechanism 26 provides a flexible, extensible adapter between the generic functionality of the SM API 24 or other ODBMS API and the particular requirements of external data stores 22 or foreign databases and files with various schemas and formats.

The external storage manager mechanism 26 described here focuses on the objects' type and data, their references to other objects, the transactions in which the objects participate, and the use of indices and extensions to quickly access the objects. Each of these "front-end" constructs is mapped by the external storage manager 26 mechanism into one or more "back-end" constructs supported directly by the available external data store(s) 22 or data storage subsystem(s). Applications written using the generic front-end constructs apply various operations to the constructs. These operations are implemented uniformly by the external storage manager 26 mechanism by either dispatching to operations specific to the external data store(s) 22 or data storage facility being supported, or by internal operations of the external storage manager mechanism 26 using data cached, as known in the art, from previous accesses to the data storage facility.

The "back end" of the external storage manager(s) 28 which communicates directly with the external data store(s) 22, consists of an API with its own set of constructs, i.e. back end constructs. Unlike the "front end", which is designed to be identical to the ODBMS API, the "back end" API is unique and not intended to be identical to any particular paradigm or standard. Instead, "back end" constructs are implemented and intended to generally correspond to the common kinds of constructs used in a wide range of data storage facilities and their APIs. Each of the back end constructs is represented in the back-end API as a "generic" or "abstract" construct which has very specific requirements but still allows a wide range of variation in-the implementation of these requirements in the context of a data storage facility. These common back end or external data storage facility API constructs and their requirements are defined as follows:

Storage manager—a dedicated object that represents a particular data storage facility. Each such data storage facility is expected to support implementations of most or all of the other common data storage facility constructs described hereinafter. Each implementation of these constructs is usually valid only within the context of a specific data storage facility. Examples of data storage facilities are disk files and specific relational databases.

Record—one or more pieces of related data that make up an entry in the data storage facility. Allowable variations on "record" include "physical records", "network or hierarchy of physical records", "collection of physical record", or "persistent object". Records provide the basis for object data and object type information presented to the application.

Key—an object containing one or more data items that can be used to identify a particular record regardless of how (other) data associated with that record may be updated. Allowable variations on "key" include "disk address", "logical record ID", "primary key (simple or composite)", "hierarchial path", "network path", or "persistent object id". Keys provide the basis for object identity and the ability to reference objects being manipulated. Keys are created "on the fly", as objects are created, to correspond to the actual location of data associated with the object.

Typemap—an object defining the transformation between records and objects. Typemaps provide the basis for representing record-based stored data as object-based application data and for transforming the object-based data updated or generated in the application (back) into record-based data for storage. There typically exists one Typemap per data storage facility and per type of object whose data is stored via that facility regardless of the number of format(s) or record type(s) in which the data is stored. Different pieces of implementation technology may be shared by Typemaps that access similar data storage facilities or similar types of object data. Each Typemap object includes key layout information and object layout information, used in constructing keys and objects as described with respect to the examples hereinafter.

Distributed Transaction—a protocol allowing any data storage facilities that support transaction processing to be notified when the application has determined that a set of changes constitutes a complete transaction.

Distributed Index Iterator and Common Index—a protocol allowing any data storage facilities that support index structures to use these index structures to implement fast access to records when some of their data is known but their keys are not. Data storage facilities that do not support index structures are allowed to use key-based "common" index structures stored by the external storage manager mechanism on their behalf, or to provide alternative (slow) forms of access, for the sake of completeness.

Distributed Extension Iterator and Common Extension—a protocol allowing any data storage facilities that support iteration over all records corresponding to an object type to use this capability to produce appropriate objects when the application attempts to process all of the objects of a given type. Data storage facilities that do not support this capability are allowed to use key-based "common" extension structures stored by the external storage manager mechanism on their behalf.

The operation of the external storage manager mechanism 26, which maps the front end constructs of a typical ODBMS to the set of back end constructs manipulated by respective external storage manager(s) 28 and supported by the external data store(s) 22, is effected by abstract classes of functions. Such operation serves as the basis for storage management for applications that store ODBMS data in external data stores or store external data in the ODBMS for use by an object application. The abstract classes of functions are set forth in the following text taken from the ONTOS DB 3.0 Reference Manual Volume I Class Library.

OC_CleanupObj—OC_Entity—OC_Object—OC_ExternalKey

OC_ExternalFreeFormKey

Class OC_ExternalFreeFormKey is available as part of the optional External Storage Management product, which can be used to develop external storage management for ONTOS DB 3.0 client applications.

The storage manager developer is responsible for implementing many of the functions for OC_External-FreeFormKey and classes derived from it.

OC_ExternalFreeFormKey implements some of the functions defined on its base class, OC_ExternalKey, in an architecture that allows a wide range of options for classes derived from OC_ExternalFreeFormKey.

```
To use
    #include "External.h"
Synopsis
    class OC_ExternalFreeFormKey : public OC_ExternalKey {
        protected:
            OC_ExternalFreeFormKey (
                OC_Entity* referent = (OC_Entity*) 0);
            OC_ExternalFreeFormKey (OC_APL* theAPL);
            ~OC_ExternalFreeFormKey ( );
            virtual OC_Object* getReferent (OC_ExternalSM*&,
                OC_Type*&, OC_LockType);
            virtual OC_ExternalSM* getExternalSM ( ) = 0;
            virtual void* getReferenceText (OC_ExternalSM*,
                OC_LockType) = 0;
            virtual OC_Type* getTypeOfObj (void*) = 0;
            virtual OC_Object* getProtoObj (void*, OC_Type*) =
                0;
    };
```

Constructors and destructors

```
OC_ExternalFreeFormKey (
        OC_Entity* referent = (OC_Entity*) 0);
```

Constructor for OC_ExternalFreeFormKey; optional argument referent points to the entity that this key represents.

OC_ExternalFreeFormKey(OC_APL* theAPL);

Activation constructor.

~OC_ExternalFreeFormKey( );

Destructor for OC_ExternalFreeFormKey.

Class Library reference

Member functions virtual OC_ExternalSM* getExternalSM( );

Returns the OC_ExternalSM associated with this OC_External FreeFormKey.

```
virtual OC_Object* getProtoObj (void* dataStruct,
        OC_Type* objType);
```

Returns an initialized but inactive OC_Object. The argument dataStruct is a free-form data structure representing the object; its value can be obtained through a call to OC_ExternalFreeFormKey::getReferent-Text( ). The argument objType also represents the object; its value can be obtained through a call to OC_ExternalFreeFormKey::getTypeOfObj( ).

```
virtual OC_Object* getReferent (OC_ExternalSM*& extSM,
        OC_Type*& type, OC_LockType lock);
```

Returns a pointer to the referent of this OC_ExternalTypeMappedKey. See the entry on OC_ExternalKey::get-Referent( ), starting on page\2–159, for a detailed description.

```
virtual void* getReferentText (
    OC_ExternalSM* extSM, OC_LockType lock);
```

Returns a pointer to a free-form data structure that represents, in a format specific to an OC_External-FreeFormKey class implementation, the state of an object to be activated. The extSM argument is the object's storage manager, and lock argument is the type of lock for the object.

```
virtual OC_Type* getTypeOfObj(void* dataStruct);
```

Returns the OC_Type of the object described by dataStruct, a free-form data structure whose value can be obtained through a call to OC_ExternalFreeFormKey::getReferentText( ).

See also
Related classes
OC_ExternalSM, OC_ExternalTypeMap, and OC_ExternalKey
Related documentation
See in the discussion about external keys in the ONTOSDB External Storage Management Guide.

OC_CleanupObj—OC_Iterator—OC_ExternalInstIterator—OC_ExternalIndexIterator

Class OC_ExternalIndexIterator is available as part of the optional External Storage Management product, which can be used to develop external storage management for ONTOS DB 3.0 client applications.

Class OC_ExternalIndexIterator, derived from OC_ExternalInstIterator, provides iteration over indexed properties on objects mapped by the iterator's associated OC_ExternalTypeMap instance.

```
To use
    #include "External.h"
Synopsis
    class OC_ExternalIndexIterator : public
    OC_External-InstIterator{
        public:
            OC_ExternalIndexIterator (OC_ExternalTypeMap*
            source,
                OC_Type* type, OC_Property* prop,
                OC_-Argument value,
                OC_LockType lock, void* cursorData = 0);
            OC_ExternalIndexIterator (OC_ExternalTypeMap*
            source,
                OC_Type* type, OC_Property* prop,
                OC_Argument start,
                OC_Argument end, OC_Boolean yieldInOrder,
                OC_LockType lock, void* cursorData = 0);
            virtual OC_Boolean moreData ( );
            OC_Property* getProperty ( );
            OC_Argument getStart ( );
            OC_Argument getEnd ( );
            OC_Boolean get YieldsInOrder ( );
            OC_Boolean getYieldsRange ( );
    };
```

Constructors

```
OC_ExternalIndexIterator (OC_ExternalTypeMap* source,
    OC_Type* type, OC_Property* prop, OC_Argument value,
    OC_LockType lock = OC_defaultLock,
    void* cursorData = 0);
OC_ExternalIndexIterator (OC_ExternalTypeMap* source,
    OC_Type* type, OC_Property* prop, OC_Argument start,
    OC_Argument end, OC_Boolean yieldInOrder,
    OC_LockType lock = OC_defaultLock,
    void* cursorData = 0);
```

OC_ExternalIndexIterator constructors. The first overload initializes the instance's data members to the same state achieved by reset( ).

The constructors' arguments are the following:

| | |
|---|---|
| source | Pointer to the OC_ExternalTypeMap that generated this instance. |
| type | Pointer to the type of objects the iterator returns. |
| prop | Pointer to the OC_Property over which to iterate. |
| value | Value required for prop for the iterator to return the object. |
| lock | Type of lock for objects in the iteration. |
| cursorData | Optional pointer to an implementation-specific object, which contains data for tracking the state of the iteration. |
| yieldInOrder | Value OC_true yields an index in ascending order of the property's value. |
| start | First value in a range of indexes. |
| end | Last value in a range of indexes. |

Member functions
```
OC_Argument getEnd( );
```
Returns the end index of the range for iteration. If the iteration is for all objects with the identical single value for a property, getEnd( ) returns the single value.
```
OC_Property* getProperty( );
```
Returns a pointer to the property for the iteration.
```
OC_Argument getStart( );
```
Returns the starting index of the range for iteration. If the iteration is for all objects with the identical single value for a property, getStart( ) returns the single value.
```
OC_Boolean getYieldsInOrder( );
```
Returns OC_true if the iterator yields in index order; returns OC_false otherwise.
```
OC_Boolean getYieldsRange( );
```
Returns OC_true if the iterator yields a range of indices; returns OC_false otherwise.
```
OC_Boolean moreData( );
```
Not implemented for this class.
See also
Related classes
OC_ExternalSM, OC_ExternalTypeMap, OC_ExternalKey, OC_Iterator, and OC_ExternalInstIterator
Related documentation
See the discussion about implementing iteration of type-mapped objects in the ONTOS DB External Storage Management Guide.

OC_CleanupObj—OC_Iterator—OC_ExternalInstIterator

Class OC_ExternalInstIterator is available as part of the optional External Storage Management product, which can be used to develop external storage management for ONTOS DB 3.0 client applications.

Class OC_ExternalInstIterator, derived from OC_Iterator, provides iteration over objects that are mapped by the iterator's associated OC_ExternalTypeMap instance.

```
To use
    #include "External.h"
Synopsis
    class OC_ExternalInstIterator : public OC_Iterator {
        public:
            OC_ExternalInstIterator (OC_ExternalTypeMap*
            source,
                OC_Type* type, OC_LockType lock =
                OC_defaultLock,
                void* cursorData = 0);
```

-continued

```
    virtual OC_Boolean moreData ( );
    virtual OC_Argument operator ( ) ( );
    virtual OC_Entity* yieldEntityValue ( );
    virtual long yieldIntegerValue ( );
    virtual char* yieldStringValue ( );
    virtual double yieldRealValue ( );
    virtual void* yieldPointerValue ( );
    virtual OC_Boolean yieldLogicalValue ( );
    virtual char yieldCharacterValue ( );
    virtual void reset (OC_LockType lock =
      OC_-defaultLock);
    virtual void reset (OC_Entity* ent,
        OC_LockType lock = OC_defaultLock);
    virtual OC_Boolean seek (long offset,
      OC_SeekType sType);
protected:
    OC_ExternalTypeMap* getSource ( );
    void* getCursorData ( );
    OC_Type* getType ( );
};
```

Constructors

```
OC_ExternalInstIterator (OC_ExternalTypeMap* source,
    OC_Type* type, OC_LockType lock =
    OC_defaultLock,
    void* cursorData = 0);
```

OC_ExternalInstIterator constructor. The constructor's arguments are the following:

| | |
|---|---|
| source | Pointer to the OC_ExternalTypeMap that generated this instance. |
| type | Pointer to the type of objects that the iterator returns. |
| lock | Type of lock for objects in the iteration. |
| cursorData | Optional pointer to an implementation-specific object, which contains data for tracking the state of the iteration. |

Member functions void* getCursorData( );

Returns a pointer passed as the cursorData argument to the OC_ExternalInstIterator constructor. If the constructor was called with cursorData equal to 0, this function returns 0.

virtual OC_ExternalTypeMap* getSource( );

Returns a pointer to the type map that generated this OC_ExternalInstIterator.

virtual OC_Type* getType( );

Returns a pointer to the OC_Type over which this OC_ExternalInstIterator iterates.

virtual OC_Boolean moreData( );

Returns OC_true if there is more data over which to iterate; returns OC_false otherwise.

virtual OC_Argument operator( )( );

Returns the next instance, if any.

virtual void reset(OC_LockType lock=OC_defaultLock);

```
virtual void reset (OC_Entity* ent,
    OC_LockType lock = OC_defaultLock);
```

Not needed for this class. Calling either raises an OC_NotImplemented exception.

virtual OC_Boolean seek(long offset, OC_SeekType sType);

Not needed by OC_ExternalInstIterator; its default implementation raises an OC_NotImplemented exception.

virtual char yieldCharacterValue( );

Not needed by OC_ExternalInstIterator; its default implementation raises an OC_NotImplemented exception.

virtual OC_Entity* yieldEntityValue( );

Returns the next instance, if any.

virtual long yieldIntegerValue( );

virtual char* yieldStringValue( );

virtual double yieldRealValue( );

virtual void* yieldPointerValue( );

virtual OC_Boolean yieldLogicalValue( );

These functions are not needed by OC_ExternalInstIterator; their default implementations raise an OC_NotImplemented exception.

See also

Related classes

OC_ExternalSM, OC_ExternalTypeMap, OC_ExternalKey, OC_Iterator, and OC_ExternalIndexIterator Related documentation See the discussion about implementing iteration of type-mapped objects in the ONTOS DB External Storage Management Guide.

OC_CleanupObj—OC_Entity—OC_Object—OC_ExternalKey

Class OC_ExternalKey is available as part of the optional External Storage Management product, which can be used to develop external storage management for ONTOS DB 3.0 client applications.

OC_ExternalKey is an abstract class that must be subclassed by the storage management developer.

OC_ExternalKey subclasses encapsulate the persistent identity of objects stored in an external data store. It is possible for the storage manager developer to subclass OC_ExternalKey itself. However, subclassing one of OC_ExternalKey's ONTOS-provided subclasses, OC_ExternalTypeMappedKey and OC_ExternalFreeFormKey, is usually more beneficial.

To use
    #include "External.h"
Synopsis
```
    class OC_ExternalKey : public OC_Object {
        protected:
            OC_ExternalKey (OC_Entity* referent =
                (OC_-Entity*) 0);
            OC_ExternalKey (OC_APL* theAPL);
            ~OC_ExternalKey ( );
            void destroy (OC_Boolean aborted);
            virtual OC_Type* getDirectType ( );
            virtual unsigned long getReferentHashKey ( ) const;
            virtual unsigned long getEntityHashKey ( ) const;
            virtual OC_Boolean operator==(const
                OC_Entity& ent)
                    const;
            virtual OC_Object* getReferent
                (OC_ExternalSM*& sm,
                    OC_Type*& type, OC_LockType lock);
            virtual void lockReferent (OC_LockType lock);
            virtual void putReferent ( );
            virtual void deleteReferent ( );
            OC_Object* getReferentIfActive ( );
            OC_LockType getReferentLockType ( );
            OC_Boolean getReferentIsNew ( );
            OC_Boolean getReferentIsInDB ( );
            void setReferentLockType (OC_LockType
                theLock);
```

```
};
OC_ExternalKey (OC_Entity* referent =
    (OC_Entity*) 0);
```

Constructor for OC_ExternalKey; optional argument referent points to the entity that this key represents.

OC_ExternalKey(OC_APL* theAPL);

Activation constructor.

~OC_ExternalKey( );

Destructor for OC_ExternalKey.

Member functions virtual void deleteReferent( );

Removes from the database the referent of this OC_ExternalKey. The storage manager developer must implement this function.

virtual unsigned long getEntityHashKey( );

Returns the hash key value for the referent of this OC_ExternalKey. The storage manager developer must implement this function.

```
virtual OC_Object* getReferent (OC_ExternalSM*& extSM,
    OC_Type*& type, OC_LockType lock);
```

Returns a pointer to the referent of this OC_ExternalKey. The referent returned is initialized but inactive; that is, its data members have been initialized from a persistent representation of the object, but its activation constructor has not yet executed. The function also returns, through the extSM argument, a pointer to the referent's storage manager. It also returns, through the type argument, a pointer to the OC_Type of the referent. The lock argument is the type of lock for the referent. The storage manager developer must implement this function.

virtual unsigned long getReferentHashKey( );

Returns the hash key value for the referent of this OC_ExternalKey. The default implementation returns the same value as OC_ExternalKey::getEntityHashKey( ).

virtual void lockReferent(OC_LockType lock);

Acquires or upgrades a lock, of the specified OC_LockType, on the referent of this OC_ExternalKey. Attempts to downgrade a lock or to reacquire an existing lock have no effect. The storage manager developer must implement this function.

Note that setting lock-buffering options with OC_setLockBuffering( ) or similar functions has no effect on objects with external storage managers.

virtual OC_Boolean operator==(OC_Entity& key);

Returns OC_true if this OC_ExternalKey and the OC_ExternalKey referenced by key are duplicate instances. The function returns OC_false otherwise. The key argument must be associated with the same OC_ExternalSM instance as this OC_ExternalKey; however, the two keys may have been created by different OC_ExternalTypeMaps. (The type of parameter key is OC_Entity only for the purpose of internal optimization; the key argument must be of type OC_ExternalKey.)

The storage manager developer must implement this function.

virtual void putReferent( );

Stores in the database the current state of the referent of this OC_ExternalKey. If the referent already exists in the database, putReferent( ) replaces it with the current state of the object.

The storage manager developer must implement this function.

See also

Related classes

OC_ExternalSM and OC_ExternalTypeMap

Related documentation

See the discussion about implementing external keys in the ONTOS External Storage Management Guide.

OC_CleanupObj—OC_Entity—OC_Object—OC_StorageManager—OC_ExternalSM

Class OC_ExternalSM is available as part of the optional External Storage Management product, which can be used to develop external storage management for ONTOS DB 3.0 client applications.

OC_ExternalSM is an abstract class that must be subclassed by the storage management developer.

OC_ExternalSM subclasses serve as the basis for storage management for applications that store ONTOS DB data in external data stores and/or store external data in ONTOS DB. External data stores include non-ONTOS DB databases with various paradigms and schemas, as well as files of various formats.

OC_ExternalSM is the recommended starting point for defining external storage manager classes. OC_ExternalSM has the same interface (member functions) as its base class, OC_StorageManager. For development of external storage managers, OC_ExternalSM offers two advantages over its base class:

OC_ExternalSM implements many of the OC_StorageManager-defined virtual functions, with functionality to serve a wide range of OC_ExternalSM-based classes. For most external storage managers, most of these ONTOS-provided implementations provide the needed functionality.

Many OC_ExternalSM functions translate an invocation of an OC_ExternalSM function into an invocation of a function on an OC_ExternalKey- or OC_ExternalTypeMap-derived class. This delegation of functions to component classes supports code reuse, as a single OC_ExternalSM subclass may use several instances of a single component class or instances of different component classes.

```
To use
    #include "External.h"
Synopsis
    class OC_ExternalSM : public OC_StorageManager {
    public:
        virtual OC_Type* getDirectType ( );
        virtual void putObject (OC_Boolean deallocate =
        OC_false);
        virtaul void deleteObject (
            OC_Boolean deallocate = OC_false);
        OC_Iterator* getTypeMapIterator (
            OC_LockType lock = OC_defaultLock);
        virtual OC_ExternalTypeMap* getTypeMap
        (OC_Type* theType);
    protected:
        OC_ExternalSM (char* name = (char*) OC_null);
        OC_ExternalSM (OC_APL* theAPL);
        ~OC_ExternalSM ( );
        void destroy (OC_Boolean aborted);
        virtual OC_Boolean isReferentActive
        (OC_-Reference* ref);
        virtual OC_Boolean isReferentModified
        (OC_-Reference* ref);
        virtual OC_Boolean isReferentNew
        (OC_Reference* ref);
```

```
virtual OC_Boolean isReferentInDB
    (OC_-Reference* ref);
virtual OC_Boolean isReferentDeleted
    (OC_-Reference* ref);
virtual OC_Entity* getReferent (OC_Reference* ref,
    OC_LockType lock);
virtual OC_LockType getReferentLockType (
    OC_Reference* ref);
virtual void lockReferent (OC_Reference* ref,
    OC_LockType lock);
virtual void discardReference (OC_Reference* ref,
    OC_Boolean persistently);
virtual void* allocateObj (long sz, OC_Type* theType,
    OC_Object* obj, OC_Clustering clustering);
OC_Object* activate (OC_Object* obj,
OC_Type* the Type,
    OC_ExternalKey* key);
virtual OC_Boolean isObjNew (OC_Object* obj);
virtual OC_Boolean isObjInDB (OC_Object* obj);
virtual OC_Boolean isObjDeleted (OC_Object* obj);
virtual OC_Boolean isObjModified (OC_Object* obj);
virtual void markObjModified (OC_Object* obj);
virtual void unmarkObjModified (OC_Object* obj);
virtual void putObj (OC_Object* obj);
virtual void lockObj (OC_Object* obj,
OC_Lock-Type lock);
virtual OC_LockType getObjLockType
(OC_Object* obj);
virtual void deleteObj (OC_Object* obj);
virtual void destroyObj (OC_Object* obj);
virtual void deallocateObj (void* Obj);
virtual unsigned long getObjHashKey (OC_Object* obj);
virtual unsigned long translateRefValue (
    OC_Entity* referent);
virtual unsigned long translateRefValue (
    unsigned long oldRefValue,
OC_StorageManager* oldContext);
virtual OC_Boolean compareReferences (
    OC_Reference* r1, OC_Reference* r2);
virtual void makePersistentReference (
    unsigned long refValue,
    OC_Storage-Manager* forWhom,
    OC_PersistentReference& toBeSet);
virtual unsigned long resolvePersistent-Reference (
    const OC_PersistentReference& toBe-Resolved,
    OC_StorageManager* forWhom);
virtual void replacePersistentReference (
    const OC_PersistentReference& toBe-Replaced,
    const OC_PersistentReference& replacement,
    OC_StorageManager* forWhom);
virtual unsigned long
getInstanceCount-(OC_Type* theType);
virtual OC_Iterator* getIterator (OC_Type* theType,
    OC_LockType lock);
virtual OC_Iterator* getIterator (OC_Type* theType,
    OC_Property*, OC_Argument value,
    OC_LockType lock);
virtual OC_Iterator* getIterator (OC_Type* theType,
    OC_Property* prop, OC_Argument start,
    OC_Argument end,
    OC_Boolean yieldInOrder, OC_LockType lock);
virtual void startTransaction ( );
virtual void abortTransaction ( );
virtual void checkpointTransaction ( );
virtual void commitTransaction ( );
virtual void cleanCache ( );
virtual void beforeKeepCache ( );
virtual void afterKeepCache ( );
virtual void closeDatabase (OC_Boolean cleanall);
OC_Dictionary* getMaps ( );
void addTypeMap (OC_Type* theType,
    OC_ExternalTypeMap* theMap);
void removeTypeMap (OC_Type* theType,
    OC_ExternalTyepMap* theMap);
virtual OC_ExternalKey* validateKey
    (OC_-ExternalKey* key);
};
```

Constructors and destructors

OC_ExternalSM(char* name=(char*) OC_null);

Constructor for OC_ExternalSM; name is the optional object name.
OC_ExternalSM(OC_APL* theAPL);
Activation constructor.
~OC_ExternalSM( );
Destructor for OC_ExternalSM.
Member functions
  void abortTransaction( );
The storage manager developer implements this function, which is called at the beginning of OC_transaction-Abort( ).

---
void activate (OC_Object* obj, OC_Type* theType,
    OC_ExternalKey* key;

---

Performs the final processing required to activate obj, which is a memory location for an object that is initialized but inactive. The argument theType must point to the OC_Type for the object. The key argument must point to the OC_ExternalKey for the object to be activated.

The processing performed by activate( ) includes the location and invocation of the activation constructor wrapper function, vtbl simulation for instances of OC_Types that do not have an available vtbl, and initialization of storage manager and self ref values for obj.

---
void addTypeMap (OC_Type* theType,
    OC_ExternalTypeMap* theMap);

---

Adds an external type map, theMap, to the OC_Dictionary of maps for the storage manager for the OC_Type specified by theType.
  virtual void afterKeepCache( );
Empty implementation, since it is not needed by OC_ExternalSM.

---
virtual void* allocateObj (long sz, OC_Type* type,
    OC_Object* obj, OC_Clustering clustering);

---

In addition to performing other processing, allocate-Obj( ) uses the global function ::operator new to allocate space.
Note:
If you reimplement allocateObj( ), be sure also to reimplement deallocateObj( ) with a complementary algorithm.
  virtual void beforeKeepCache( );
Empty implementation, since it is not needed by OC_-ExternalSM.
  virtual void checkpointTransaction( );
The storage manager developer implements this function, which is called at the beginning of OC_transaction-Checkpoint( ).
  virtual void cleanCache( );
Deletes from memory this storage manager instance and all its associated OC_ExternalKey and OC_ExternalTypeMap instances. Before deleting the OC_ExternalSM, clean-Cache( ) iterates over the active OC_ExternalKey and OC_ExternalTypeMap instances and deletes them from memory.
  virtual void closeDatabase(OC_Boolean cleanAll);
The storage manager developer implements this function, which is called at the beginning of OC_close( ).
  virtual void commitTransaction( );

The storage manager developer implements this function, which is called at the beginning of OC_transaction-Commit( ).

```
virtual OC_Boolean compareReferences (OC_Reference* r1,
    OC_Reference* r2);
```

Returns OC_true if r1 and r2 refer to the same referent.

virtual void deallocateObj(void* inst);

In addition to performing other processing, deallocateObj( ) uses the global function ::operator delete to deallocate space.

Note:

If you reimplement deallocateObj( ), be sure also to reimplement allocateObj( ) with a complementary algorithm.

virtual void deleteObj(OC_Object* obj);

Deletes from the database the OC_Object pointed to by obj.

If obj has no associated OC_ExternalKey, deleteObj( ) determines that it is a new object that has never been put to the database and, therefore, simply marks it as deleted. If obj has an associated OC_ExternalKey, deleteObj( ) calls the refinement of deleteReferent( ) on the object's OC_ExternalKey.

virtual void destroyObj(OC_Object* obj);

Prepares the OC_Object pointed to by obj for deallocation from memory.

```
virtual void discardReference (OC_Reference* ref,
    OC_Boolean persistently);
```

Deletes the reference pointed to by ref by calling operator delete on the OC_ExternalKey object associated with the referent. If the persistently argument is OC_true, the function also frees all resources associated with persistent references to ref's referent.

```
virtual unsigned long getInstanceCount(OC_Type*
    type);
```

Returns the approximate number of instances with OC_Type type that are stored by this storage manager. It returns 0 if this storage manager uses the common extension facility or if neither type nor any of its supertypes has an extension.

```
virtual OC_Iterator* getIterator(OC_Type* type,
    OC_LockType lock);
```

Returns an iterator for instances with OC_Type type that are controlled by this storage manager. It locks activated instances with OC_LockType lock.

```
virtual OC_Iterator* getIterator(OC_Type* type,
    OC_Property* prop, OC_Argument start, OC_Argument end,
    OC_LockType lock);
```

Returns an iterator for the instances, controlled by this storage manager, of the specified OC_Type for the specified OC_Property. Use arguments start and end to set the range of values for the property. The iterator locks activated instances with OC_LockType lock.

OC_Dictionary* getMaps

Returns the OC_Dictionary of external type maps for this storage manager. This function is called by the OC_ExternalSM functions addTypeMap( ), removeTypeMap( ), and getTypeMap( ).

virtual unsigned long getObjHashKey(OC_Object* obj);

Returns the hash key value for the OC_Object pointed to by obj. The hash key value is used when obj serves as a key in an aggregate object, such as an unordered OC_Dictionary.

virtual OC_LockType getObj LockType(OC_Object* obj);

Returns the type of the lock last acquired or upgraded to for obj. The function returns OC_noLock if the lock has not been set by one of the applicable OC_ExternalSM functions (getReferent( ), lockReferent( ), putObj( ), or deleteObj( )).

```
virtual OC_Entity* getReferent(OC_Reference* ref,
    OC_LockType lock);
```

Returns a pointer to ref's referent. If the referent has been deleted, getReferent( ) raises the OC_ObjectWasDeleted exception. The lock argument is the type of lock to use for the referent.

```
virtual OC_LockType getReferentLockType(
    OC_Reference* ref);
```

Returns the type of the lock last acquired or upgraded to for the referent of ref. The function returns OC_noLock if the lock has not been set by one of the applicable OC_ExternalSM functions (getReferent( ), lockReferent( ), putObj( ), or deleteObj( )).

virtual OC_ExternalTypeMap* getTypeMap(OC_Type* theType);

Returns a pointer to the external type map for OC_Type theType.

virtual OC_Boolean isObjDeleted(OC_Object* obj);

Returns OC_true if the OC_Object pointed to by obj has been persistently deleted by OC_ExternalSM::deleteObj( ). Returns OC_false otherwise.

virtual OC_Boolean isObj InDB(OC_Object* obj);

Returns OC_true if the OC_Object pointed to by obj is in the database. The OC_Object is in the database if one of the following criteria is met:

obj was either activated with OC_ExternalSM::defaultActivateObj( ) or deactivated through OC_ExternalSM::putObj( )

obj was not subsequently deleted through OC_ExternalSM::deleteObj( )

If one or both conditions are not met, the function returns OC_false.

virtual OC_Boolean isObjModified(OC_Object* obj);

Returns OC_true if the OC_Object pointed to by obj has been marked as modified and not subsequently marked unmodified. Otherwise, the function returns OC_false.

virtual OC_Boolean isObjNew(OC_Object* obj);

Returns OC_true if the OC_Object pointed to by obj is new. The OC_Object is new only if all the following conditions are met:

obj was created through OC_ExternalSM::allocateObj( )

obj has not been deleted through OC_External-SM::deleteObj( )

There has not been a call to OC_ExternalSM::cleanCache( ) since obj's creation

If one or more of these conditions are not met, the function returns OC_false.

virtual OC_Boolean isReferentActive(OC_Reference* ref);

Returns OC_true if ref's referent is active. The referent is active if it meets all the following criteria:
It is managed by this OC_ExternalSM
It was created through OC_ExternalSM::allocateObj( ) or was activated through the ( ) helper function, which is called by the default implementation of OC_ExternalSM::getReferent( )
It has not been deleted through OC_External-SM::destroyObj( )
If the referent does not meet all criteria, the function returns OC_false.

virtual OC_Boolean isReferentDeleted(OC_Reference* ref);

Returns OC_true if ref's referent has been deleted from the database.The referent has been deleted from the database if it meets all the following criteria:
The referent is not an OC_Primitive
The referent is an OC_Object or descendant that has been deleted from the database through OC_-ExternalSM::deleteObj( ) or has raised an OC_-ObjectWasDeleted exception upon an attempt to activate the object since the last call to OC_-ExternalSM-::cleanCache( )
If at least one criterion is not met, the function returns OC_false.

virtual OC_Boolean isReferentInDB(OC_Reference* ref);

Returns OC_true if ref's referent is in the database.The referent is in the database if one of the following criteria is met
The referent is an OC_Primitive
The referent is an CC_Object or descendant and was either activated through OC_ExternalSM::get-Referent( ) or deactivated through OC_External-SM-::putObj( ) and was not subsequently deleted through OC_ExternalSM::deleteObj( )
If neither condition is met, the function returns OC_false.
This function may activate an inactive referent if necessary to determine whether it is in the database.

virtual OC_Boolean isReferentModified(OC_Reference* ref);

Returns OC_true if ref's referent has been marked as modified. The referent is marked as modified if it meets all the following criteria:
The referent is not an OC_Primitive
If the referent is an OC_Object or descendant, the referent has not been marked unmodified since last marked modified
If the referent is an OC_Object or descendant, the referent has not been deallocated since last marked modified
If the referent does not meet all criteria, the function returns OC_false.

virtual OC_Boolean isReferentNew(OC_Reference* ref);

Returns OC_true if ref's referent is new. The referent is new only if all the following conditions are met:
Referent is not an OC_Primitive
Referent was created through OC_External-SM::allocateObj( )
Referent has not been deleted through OC_-ExternalSM::deleteObj( )

There has not been a call to OC_External-SM::cleanCache( ) since referent's creation
If one or more of these conditions are not met, the function returns OC_false.

virtual void lockObj(OC_Object* obj, OC_LockType lock);

Locks obj with, or upgrades obj's current lock to, the lock type specified by lock. If lockObj( ) executes successfully, lock becomes the new cached lock type.
This function has no effect if called with a lock type less powerful than that of the current lock—for example, OC_readLock for an object currently locked with OC_writeLock, or OC_noLock for any object.
Note that setting lock-buffering options with OC_setLockBuffering( ) or similar functions has no effect on objects with external storage managers.

--- virtual void lockReferent(OC_Reference* ref,
    OC_LockType lock);

---

Locks the referent of ref with, or upgrades the referent's current lock to, the lock type specified by lock. If lockReferent( ) executes successfully, lock becomes the new cached lock type.
This function has no effect if called with a lock type less powerful than that of the current lock—for example, OC_readLock for an object currently locked with OC_writeIntentLock, or OC_noLock for any object.
Note that setting lock-buffering options with OC_setLockBuffering( ) or similar functions has no effect on objects with external storage managers.

--- virtual void makePersistentReference(
    unsigned long refvalue, OC_StorageManager* referencer,
    OC_PersistentReference& toBeSet);

---

This function is currently not available. virtual void markObjModified(OC_Object* obj);

Marks the OC_Object pointed to by obj as "modified".

virtual void putObj(OC_Object* obj);

Puts to the database the OC_Object pointed to by obj.
If the object has no associated OC_ExternalKey, putObj( ) calls generateKey( ) on the OC_ExternalTypeMap associated with the object's type. If the object has no associated OC_ExternalKey, this function generates a key (by calling OC_ExternalTypeMap:: generateKey( ) ) and puts it to the database.
Note that setting buffering options with functions such as OC_setLockBuffering( ) or OC_setBuffering( ) has no effect on objects with external storage managers.

--- void removeTypeMap(OC_Type* theType,
    OC_ExternalTypeMap* theMap);

---

Removes an external type map, theMap, from the OC_-Dictionary of maps for the storage manager for the OC_Type specified by theType.

--- virtual unsigned long resolvePersistentReference(
    const OC_PersistentReference& toBeResolved,
    OC_StorageManager* referencer);

This function is currently not available.

```
virtual OC_Boolean replacePersistentReference(
    const OC_PersistentReference& toBeReplaced,
    const OC_PersistentReference& replacement,
    OC_StorageManager* referencer);
```

This function is currently not available.

virtual void startTransaction( );

The storage manager developer implements this function, which is called at the beginning of OC_transactionStart( ).

```
virtual unsigned long translateRefValue(
    OC_Entity* referent);
```

Returns an in-memory reference value for referent. This OC_StorageManager recognizes the returned value as an outbound reference, that is, a reference to an OC_Entity under the control of another storage manager. If referent's value is not recognized as valid, translate-RefValue( ) raises an OC_NoSuchRef exception.

```
virtual unsigned long translateRefValue(
    unsigned long oldRefValue,
    OC_StorageManager* oldContext);
```

Returns a reference value that is either an outbound reference, or a native reference that was translated by another storage manager and then passed back to this storage manager. The oldRefValue argument ms the reference value to translate. The oldContext argument points to the storage manager for oldRefValue (oldContext can be this).

If oldRefValue is not recognized as valid in the context of oldContext, translateRefValue( ) raises an OC_NoSuch-Ref exception.

virtual void unmarkObjModified(OC_Object* obj);

Removes the "modified" mark from the OC_Object pointed to by obj.

virtual OC_ExternalKey* validateKey(OC_ExternalKey* key);

If the argument key is unique, returns the same pointer passed to the function. If key is not unique, returns a pointer to the duplicate OC_ExternalKey.

See also
Related classes
OC_StorageManager, OC_ExternalKey, and OC_ExternalTypeMap
Related documentation
See the discussion about implementing the main ESM classes in the ONTOS External Storage Management Guide.

OC_CleanupObj—OC_Entity—OC_Object—OC_ExternalTypeMap

Class OC_ExternalTypeMap is available as part of the optional External Storage Management product, which can be used to develop external storage management for ONTOS DB 3.0 client applications.

OC_ExternalTypeMap is an abstract class that must be subclassed by the storage management developer.

OC_ExternalTypeMap subclasses perform processing specific to particular object types. A single OC_ExternalTypeMap subclass may support more than one OC_ExternalSM subclass.

To use
include "External.h"
Synopsis
```
class OC_ExternalTypeMap : public OC_Object {
public:
    virtual OC_Type* getDirectType ( );
    virtual void deleteObject (
        OC_Boolean deallocate = OC_false);
    virtual void putObject (OC_Boolean
        deallocate = OC_false);
    OC_Type* getMappedType ( );
    OC_ExternalSM* getExternalSM ( );
protected:
    OC_ExternalTypeMap (OC_ExternalSM* sm,
        OC_Type* theType);
    OC_ExternalTypeMap (OC_APL* theAPL);
    ~OC_ExternalTypeMap ( );
    void destroy (OC_Boolean aborted);
    virtual OC_ExternalKey* validateKey-
        (OC_ExternalKey* key,
            OC_Boolean deleteObjInvalidKey,
            OC_Boolean matchRaisesError);
    virtual unsigned long getObjHashKey
        (OC_Object* obj);
    virtual OC_Iterator* getIterator (OC_Type* type,
        OC_LockType lock);
    virtual OC_Iterator* getIterator (
        OC_Type* type, OC_Property* prop,
        OC_Argument value,
        OC_LockType lock);
    virtual OC_Iterator* getIterator (OC_Type* type,
        OC_Property* prop, OC_Argument start,
        OC_Argument end,
        OC_Boolean yieldInOrder,
        OC_LockType lock;
    virtual OC_Object* yieldValueFromExtent (
        OC_ExternalInstIterator* iter);
    virtual OC_Object* yieldValueFromIndex (
        OC_ExternalIndexIterator* iter);
    virtual OC_Object* getObj
    (OC_ExternalSM*& extSM,
        OC_Type*& type, OC_ExternalKey key,
        OC_LockType lock);
    virtual OC_ExternalKey* generateKey
    (OC_Object* obj);
    virtual void* getObjText (OC_ExternalKey* key,
        OC_LockType lock);
    virtual OC_Object* getProtoObj
    (void* data-Struct);
    virtual unsigned long getInstanceCount
    (OC_-Type* type);
    virtual void* getKeyText
    (OC_ExternalInst-Iterator* iter);
    virtual void* getKeyText
    (OC_ExternalIndex-Iterator* iter);
    virtual OC_ExternalKey* getKey
    (void* data-Struct);
    virtual void discardKeyText (void* dataStruct);
    virtual void cleanup
    (OC_ExternalInstIterator* iter);
};
```

Constructors and destructors
OC_ExternalTypeMap(OC_ExternalSM* sm, OC_Type* theType);

Constructor for an OC_ExternalTypeMap, which performs processing for instances of theType, managed by storage manager sm.

OC_ExternalTypeMap(OC_APL* theAPL);

Activation constructor.

~OC_ExternalTypeMap( );

Destructor for OC_ExternalTypeMap.
Member functions
virtual void cleanup(OC_ExternalInstIterator* iter);

Enables this OC_ExternalTypeMap to recover all resources it has associated with iter. This function is called by OC_ExternalInstIterator::~OC_ExternalInstIterator( ).

virtual void discardKeyText(void* dataStruct);

Frees all resources associated with the data structure pointed to by dataStruct. The dataStruct argument represents the state of an OC_ExternalKey; obtain its value from OC_ExternalKey::getObjText( ).

virtual OC_ExternalKey* generateKey(OC_Object* obj);

Returns an OC_ExternalKey object that can uniquely identify and activate the OC_Object obj in current and future transactions.

OC_ExternalSM* getExternalSM( )

Returns the OC_ExternalSM with which this OC_External-TypeMap is associated.

virtual unsigned long getInstanceCount(OC_Type* type);

Returns an approximate count of the instances of type that are stored via this OC_ExternalSM. The count includes exactly one of each instance (both direct and indirect) of the type.

--- virtual OC_Iterator* getIterator (OC_Type* type,
   OC_LockType lock);
virtual OC_Iterator* getIterator (OC_Type* type,
   OC_Property* prop, OC_Argument value,
   OC_LockType lock);
virtual OC_Iterator* getIterator (
   OC_Property* prop, OC_Argument start,
   OC_Argument end,
   OC_Boolean yieldInOrder, OC_LockType lock);

---

All three signatures return a pointer to an instance of an OC_Iterator-based class. For all three, the iterator locks activated instances with OC_LockType lock.

For the first overload, the iterator returns each instance of type exactly once.

For the second overload, the iterator returns each instance of type if the instance's value for prop is equal to value.

For the third overload, the iterator returns each instance of type if the instance's value for prop falls within the range indicated by start and end. If yield-InOrder is set to OC_true, the iterator will return instances in order of ascending value for prop. If yieldInOrder is OC_false, the instances are returned unordered.

virtual OC_ExternalKey* getKey(void* dataStruct);

Returns a pointer to a new OC_ExternalKey object. The argument dataStruct is a data structure that represents the state of an OC_ExternalKey; obtain its value by calling OC_ExternalTypeMap::getKeyText( ).

virtual void* getKeyText(OC_ExternalInstIterator* iter);

virtual void* getKeyText(OC_ExternalIndexIterator* iter);

Returns a data structure representing the state of the OC_ExternalKey to be found or constructed in order to obtain its referent from the OC_ExternalInstIterator (first signature) or OC_ExternalIndexIterator (second signature) pointed to by iter. The definition and the format of the contents of the returned structure are specific to the OC_ExternalTypeMap class implementation.

Depending upon the specific OC_ExternalTypeMap imple-mentation, the returned data structure may also contain information about the state of the OC_ExternalKey's referent. Such information can be useful in handling the presumably imminent request for the referent. It is the storage manager programmer's responsibility to provide a means of caching any such information for use in the activation of the referent.

OC_Type* getMappedType( );

Returns the OC_Type mapped by this OC_ExternalTypeMap.

--- virtual OC_Object* getObj (OC_ExternalSM*& sm,
   OC_Type*& type, OC_ExternalKey* extKey,
   OC_LockType lock);

---

Returns the referent of the external key specified by extKey. The returned OC_Object is initialized but inactive; that is, its data members have been initialized from a persistent representation of the object, but its activation constructor has not yet executed. The lock argument is the type of lock for the referent to be activated.

The function also returns two arguments in place: sm, which is the C++ reference to the address of the storage manager, and type, which is the C++ reference to the address of pointer to the OC_Type of the referent.

virtual unsigned long getObjHashKey(OC_Object* obj);

Returns a hash key value that is persistently associated with obj.

--- virtual void* getObjText (OC_ExternalKey* extKey,
   OC_LockType lock);

---

Returns a pointer to a data structure representing the state of extKey's referent, which is to be activated from the external data store. The definition and the format of the contents of the returned structure are specific to the OC_ExternalTypeMap class implementation. The lock argument specifies the type of lock for the referent to be activated.

virtual OC_Object* getProtoObj(void* dataStruct);

Returns a pointer to an object that is initialized but inactive; that is, its data members have been initial-ized from a persistent representation of the object, but its activation constructor has not yet executed. The argument dataStruct should be a structure that has been returned by OC_ExternalKey::getObjText( ).

--- virtual OC_ExternalKey* validateKey (
   OC_ExternalKey* extKey, OC_Boolean
   deleteObj-InvalidKey,
   OC_Boolean matchRaisesError);

---

If extKey is unique within the set of all external keys for the associated OC_ExternalSM object, validateKey( ) adds extKey to the OC_ExternalSM's keys and returns extKey. If extKey is not unique, validateKey( ) returns a pointer to the duplicate key.

--- virtual OC_Object* yieldValueFromExtent (
   OC_ExternalInstIterator* iter);
virtual OC_Object*
   yieldValueFromIndex (OC_ExternalIndexIterator*);

---

Returns the next value in the iteration. This function is called by moreData( ) on the passed OC_ExternalInstIterator (first signature) or OC_ExternalIndexIterator(second signature) pointed to by iter.

See also
Related classes
OC_ExternalSM, OC_ExternalKey, OC_ExternalInstIterator, and OC_ExternalIndexIterator
Related documentation
See the chapter about implementing external type mapping in the ONTOS External Storage Management Guide.
OC_CleanupObj—OC_Entity—OC_Object—OC_ExternalKey OC_ExternalTypeMappedKey Class OC_ExternalTypeMappedKey is available as part of the optional External Storage Management product, which can be used to develop external storage management for ONTOS DB 3.0 client applications.

The storage manager developer is responsible for implementing many of the functions for OC_ExternalTypeMappedKey and classes derived from it.

OC_ExternalTypeMappedKey implements some of the func-tions defined on its base class, OC_ExternalKey, in an architecture that is closely associated with the OC_-ExternalTypeMap class. Of the external key classes, OC_ExternalTypeMappedKey provides the most support for development of external key classes.

To use
    #include "External.h"
Synopsis
    class OC_ExternalTypeMappedKey : public
    OC_ExternalKey {
        protected:
            OC_ExternalTypeMappedKey
            (OC_ExternalTypeMap* theTypeMap,
                OC_Entity* referent);
            OC_ExternalTypeMappedKey
            (OC_APL* theAPL);
            virtual OC_Object* getReferent
            (OC_External-SM*&,
                OC_Type*&, OC_LockType lock);
            OC_ExternalTypeMap* typeMap ( );
    };

Constructors

OC_ExternalTypeMappedKey
(OC_ExternalTypeMap* theTypeMap,
    OC_Entity* referent);

Constructor for OC_ExternalTypeMappedKey, with argument theTypeMap pointing to the associated type map and argument referent pointing to the entity with which this key object is associated.
    OC_ExternalTypeMappedKey(OC_APL* theAPL);
    Activation constructor.
    Member functions virtual OC_Object* getReferent (OC_ExternalSM*& extSM,
    OC_Type*& type, OC_LockType lock);

Returns a pointer to the referent of this OC_ExternalTypeMappedKey. See the entry on OC_ExternalKey::get-Referent( ), starting on page 2-159, for a detailed description.
OC_ExternalTypeMap* typeMap( );
Returns a pointer to the OC_ExternalTypeMap that created this OC_ExternalTypeMappedKey.
See also
Related classes
OC_ExternalSM, OC_ExternalTypeMap, and OC_ExternalKey Related documentation
See the chapter about implementing external keys in the ONTOS External Management Guide.

The external storage manager mechanism 26 includes a repository 30 associated therewith, to facilitate the mapping of the front end constructs of a typical ODBMS to the set of back end constructs manipulated by respective external storage manager(s) 28 and supported by the external data store(s) 22. The repository 30 is effectively a DBMS which includes application specific areas for schema loading and schema mapping of objects that directly reflect the structure of the data stored in a respective external data store 22. In schema loading of the repository, such objects stored in the repository 30, are created to represent record structures of data stored in accordance with the schema of the external data store 22. A one to one mapping is effected between record definitions of the external data store and objects in the repository 30 that represent those record structures.

In schema mapping, the record definitions are associated with object API constructs, e.g. object class definitions or object types in the case of the illustrative embodiment including ONTOS DB. A shema mapping mechanism is used in this illustrative embodiment to create storage manager objects and type maps associated with OOP application types. The Typemaps are populated with object layout (FIG. 5, 54) information organized as: value property maps, reference property maps and set property maps. Value property maps map relational data store columns to object properties. Reference property maps map foreign/relational keys to object reference valued properties. Set property maps map remote foreign keys to set valued properties.

Typically, a number of tables of an external data store are selected to be mapped in accordance with the requirements of the application. For each selected table, the shema mapping mechanism creates a new type and creates a Typemap in the storage manager for each type created. The Typemap links the table to the type in the respective storage manager object.

For each column in each selected table, the shema mapping mechanism creates an appropriate property and creates a value property map in the object layout portion of the associated Typemap. For each foreign key in the table, the schema mapping mechanism creates an appropriate property and a reference property map in the object layout of the appropriate Typemap.

For each foreign key that references this table the schema mapper creates an appropriate property and creates a set property map in the type map. Thus, data record structures of the external data store 22 represent6d by objects created/loaded in the repository 30 during schema loading, are mapped to the object structures of the applicable OOP application 10.

The effect of the external storage manager mechanism is to allow object oriented database application code to work as-is regardless of whether the data being manipulated is actually stored in an object-oriented database system, or in any other kind of data storage facility. The external storage manager is implemented in an architecture consisting of OOP message-based components, as described hereinbefore, which also allows application code to operate simultaneously on complementary sets of data distributed across multiple data storage facilities. Flexibility is achieved by substituting implementations based on back end components for each of the operations specified in the object model used in the application and presented at the front end API. To demonstrate this, several samples of pseudocode for an object-oriented database application are presented hereinafter, followed by a detailed analysis of the workings of the external storage manager at each step in the application program. Each step will be analyzed with an explanation of:

its object semantics—the front end operations intended by the application developer. These operations would be executed directly as primitive system operations in a pure object-oriented database programming system;

its mapped implementation—the steps taken by the external storage manager mechanism, often including sending messages to the components associated with one or more data storage facilities;

and, its component implementation(s) (as needed)—a typical external data store component's response to any messages passed to it in the process of mapping the front end constructs to the back end constructs. Component implementations for different external data storage facilities will naturally differ according to the data formats and access procedures peculiar to each data storage facility, and will be known to those of ordinary skill in the art. For purposes of exposition, this example will assume a single external data storage facility based on a specific relational database (RDB) being accessed via SQL.

Figures 3, 4A:
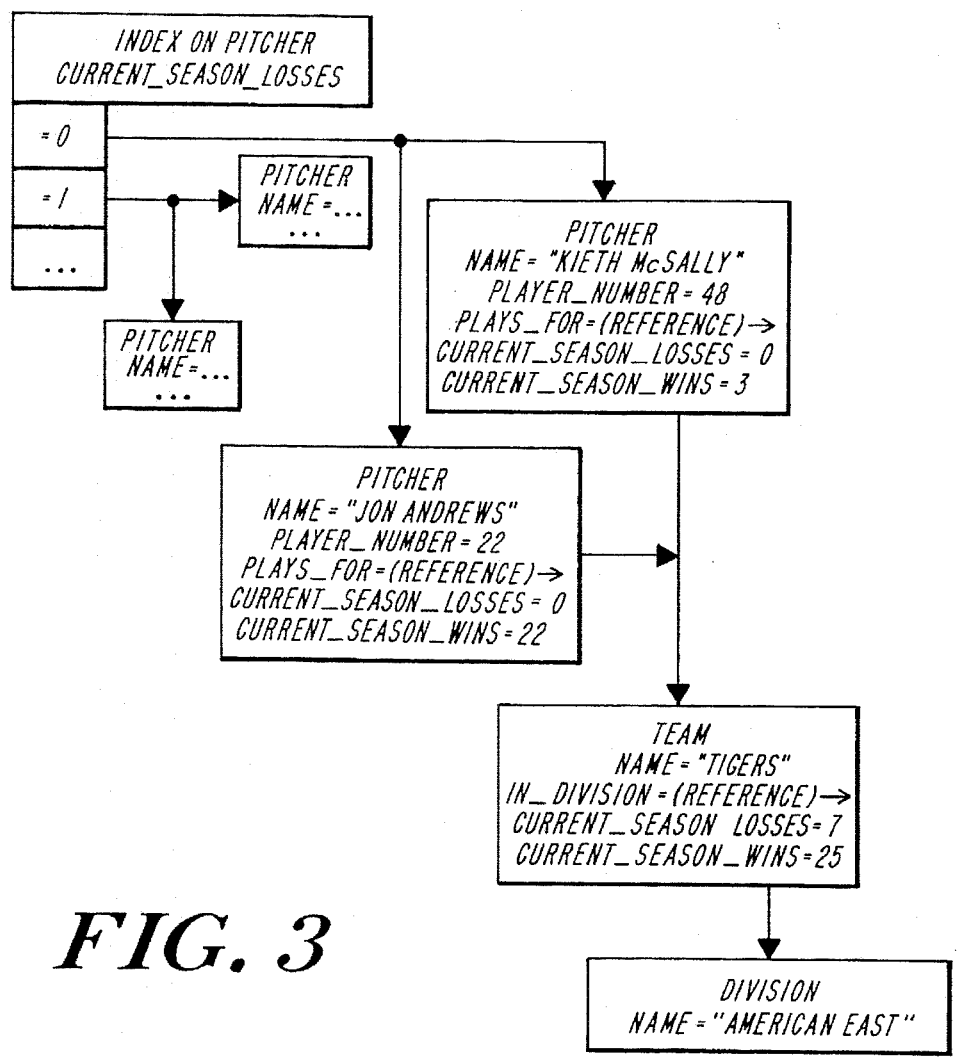
FIG. 3 is a diagrammatic representation of an object model of object data structures for an example of an implementation of an object oriented data store integration environment according to the invention.

The application code example will carry forward the baseball database example and assume an object model set forth in a small data sample illustrated in FIG. 3. The object model includes information as follows.

| Object Model | |
|---|---|
| Object type: | division |
| Attributes: | name (a string) |
| Object type: | team |
| Attributes: | name (a string) |
| | city (a string) |
| | season_losses (a number) |
| | season_wins (a number) |
| References: | home_field (a reference to a ball_park object) |
| | in_division (a reference to a division object) |
| Object type: | pitcher |
| Attributes: | name (a string) |
| | player_number (a number) |
| | current_season_losses (a number) |
| | current_season_wins (a number) |
| References: | plays_for (a reference to a team object) |
| Indexes: | for fast exact match on current_season_losses |
| | for fast exact match on current_season_wins |

In this example, as in typical implementations of the integration environment according to the invention, the object model for the object application is quite different from the data representation of the data stored in the external data store to be integrated with the object application. In this case, a relational database schema is integrated. A small relational data sample corresponding to the object model of FIG. 3, is set for in FIG. 4.

The example uses the following relational schema stored in an external relational data store:

| Table: TEAM | |
|---|---|
| Attributes: | NAME |
| | DIVISION_NAME |
| | CITY |
| | SEASON_WINS |
| | SEASON_LOSSES |
| | BALL_PARK |
| Index: | for fast exact match on NAME which is unique |
| Table: PLAYER | |
| Attributes: | NAME |
| | PLAYER_NUMBER |
| | TEAM_NAME |
| | CAREER_BATTING_AVERAGE |
| | SEASON_BATTING_AVERAGE |
| Index: | for fast exact match on NAME which is unique |
| Table: PITCHER | |
| Attributes: | NAME |
| | CAREER_WINS |
| | CAREER_LOSSES |
| | CAREER_STARTS |
| | CAREER_SAVES |
| | CAREER_GAMES |
| | SEASON_WINS |
| | SEASON_LOSSES |
| | SEASON_SAVES |
| | SEASON_GAMES |
| Indexes: | for fats exact match on NAME which is unique |
| | for fast exact match on SEASON_LOSSES |
| | for fast exact match on SEASON_WINS |

EXAMPLE 1

The following pseudocode example shows some typical processing in an object-oriented database application:

1. start_a_transaction ( );
2. query q1 ("EACH picher WITH current_season_losses = 0");
3. while (there_are_more_results_from (q1)
   {
4. pitcher the_pitcher = the_next_result_from (q1);
5. team the_team = the_pitcher.plays_for;
6. print (the_pitcher.name,
      "who plays for the",
      the_team.name),
   }
7., commit_a_transaction ( );

Upon starting the application represented by the pseudocode, a transaction is initiated by the code:

1. start_a_transaction( );

The transaction should be initiated so that any updates that follow in the program will be treated as parts of a single atomic operation, and any updates made simultaneously in any other programs' transaction will be treated by the ODBMS as a single atomic operation, either entirely visible or invisible while this program's transaction is in force.

The external storage manager mechanism 26 notes the onset of a transaction and notifies all currently active data storage facilities (none so far) to include any future operations within the scope of this transaction. At this point, there is no response by the external data store 22 to the initiation of a transaction by the application.

The subsequent application code:

2. query q1 ("EACH pitcher WITH current_season_losses=0");

Invokes the ODBMS query processor to start a query of all pitchers whose current_season_losses attribute is 0. The query optimizer of the ODBMS organizes the query to use the index on current_season_losses to expedite the data processing.

The external storage manager mechanism 26 maintains the repository 30 including objects associated with the external data store(s) 22 that are managed in the particular implementation. The external storage manager mechanisms repository includes a dedicated (external) storage manager object 28 associated with each of the external data stores 22 managed by the external storage manager mechanism 26. The external storage manager mechanism 26 queries its repository 30 to determine that a specific relational database (RDB) is managed which contains data for pitcher objects, and participates in index operations which relate to the parameter "current_season_losses".

The storage manager object associated with the RDB that contains data for pitcher objects is retrieved from the repository and is made active. That storage manager object is sent a message from the external storage manager mechanism 26 to participate in the current indexed query. The protocol surrounding this message expects the relevant storage manager to produce a reference to an iterator object. In turn, a typical iterator object's protocol, as known in the art, requires it to produce successive values in a series whenever it receives a message instructing it to do so, until the series of values is exhausted.

Figure 5:
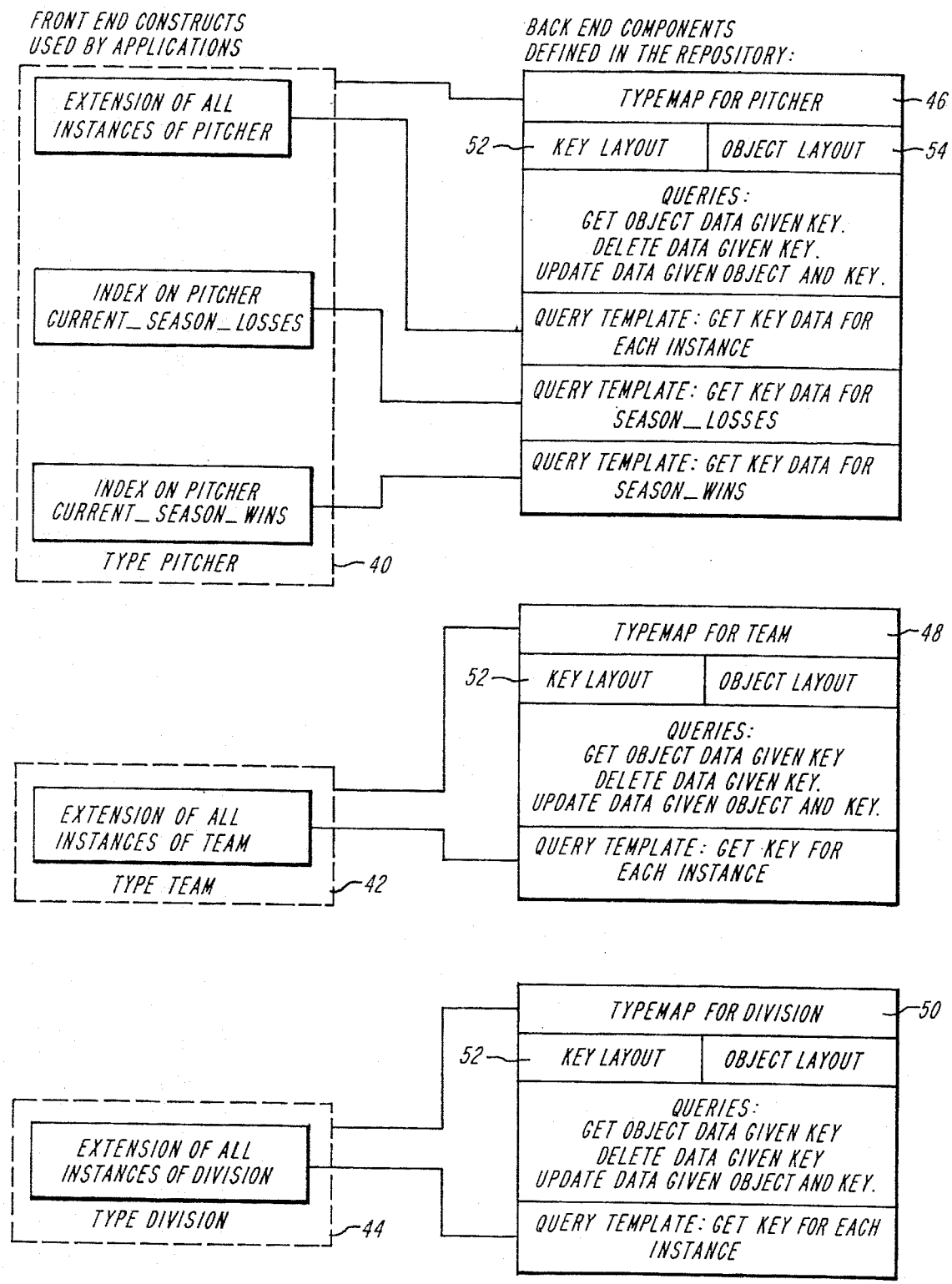
FIG. 5 depicts a sample of information typically held in a repository maintained by an external storage manager according to the invention, and illustrates how such information is connected with schema-level constructs of the object model.

The repository 30 as discussed hereinbefore, through its associated DBMS, in addition to containing storage manager objects associated with external data stores also contains configuration information used by the external storage manager mechanism 26. FIG. 5 depicts a sample of information, in accordance with the present illustrative embodiment and example, typically held in the external storage manager's repository, and how such information is connected with the schema-level constructs of the object model. Objects in the repository associated with the record structures of data stored in the external data store(s) define the relationship(s) linking the front end constructs of the ODBMS API and the back end constructs of the external data store.

The front end constructs related to the ODBMS application, which include indices and/or extensions associated with the types pitcher 40, team 42 and division 44 according to the present example, are mapped to the external relational data via Typemap backend constructs defined in the repository 30. The front end OOP types 40, 42, 44 have associated therewith backend Typemap objects that include a Typemap for pitcher 46, a Typemap for team 48, and a Typemap for division 50.

Each of the Typemaps in the repository include key layout information 52, associated with the respective OOP type and Typemap construct, which is comprised of structural information that describes the key, or object containing data items that can be used to identify a particular RDB record. The key layout information also includes information that describes the process by which the Typemap will create the key on the fly, as discussed hereinafter, to describe the object containing data items that can be used to identify a particular RDB record.

Object layout information 54 is also included in the Typemap construct in the repository 30. The object layout information 54 includes information, as discussed hereinbefore, which may be used to construct objects using data gathered from the external data store(s) via queries of the external data store in response to the needs of the object application. The external storage manager mechanism 26, upon identification of the external data store 22 including data of a type implicated by the application 10, sends messages to the Typemap in the repository 30 in accordance with the front end constructs used by the application. The messages effect generic database functionality and invoke query syntax templates which are directed to the external data store and relate to the data needed to construct objects and keys, as described in detail hereinafter.

Figure 6:
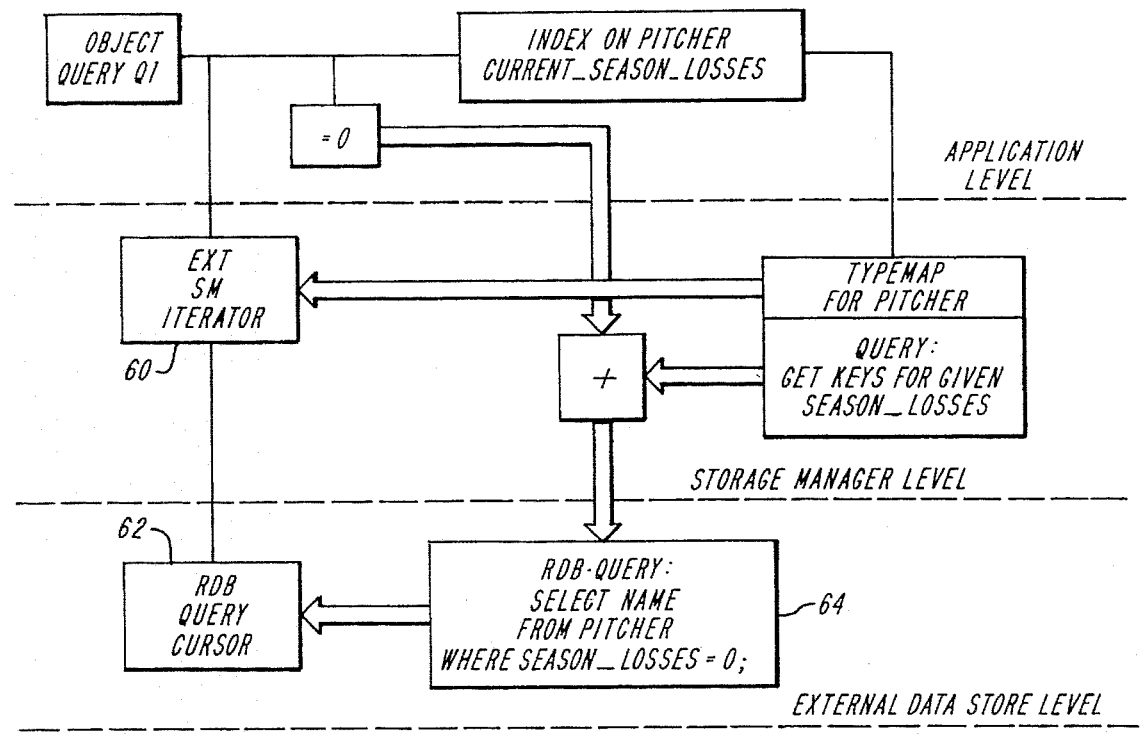
FIG. 6 is a diagrammatic representation of a process of implementing an object query mapped to an RDB query.

Referring now to FIG. 6, the process of implementing an object query mapped to an RDB query is depicted. In this example the iterator is expected to produce successive results (references to pitcher objects) of the query, issued as an object query (q1) by the ODBMS application, requesting all pitchers whose current_season_losses attribute equals zero. The external storage manager's response to this message is typically to note the type involved in the query (pitcher), select a Typemap object appropriate for that type, and pass along the message to the Typemap object, which is expected to produce an external storage manager iterator 60.

The newly active external storage manager 28 associated with the external RDB detects that an application transaction is already in progress. In response, it establishes a connection to the external RDB and issues a "START TRANSACTION" command to the RDB to bring it up to date (not shown in FIG. 6). The Typemap object responds to the message to participate in the indexed query by producing a reference to the external storage manager iterator object 60. The iterator object 60 is constructed to be associated with a query to the RDB and typically references a "query cursor" 62, associated with the status of such a query 64, as known in the art. The exact format of the RDB query will be discussed below.

The application pseudocode:

3. while (there_are_more_results_from (q1);
effects a check of the status of the object query to determine whether there are any (and on successive calls, whether there are any more) results forthcoming from the query.

With each execution of this statement, the iterator 60 is sent a message to determine whether it has any more results to produce. The external storage manager 28 returns a "true" status flag if the iterator 60 indicates that it has more results. If the iterator indicates that it has no (more) results, the external storage manager 28 turns to any other iterators produced by any other participating storage managers (none, in this example). When there are no more iterators producing results, the external storage manager returns a "false" status flag.

The message sent to the iterator causes the iterator cooperating with its associated Typemap to initiate the RDB query (if it has not already been initiated) and determine the query cursor's status. The iterator returns a flag indicating whether the RDB query has any (more) results.

Figure 7:
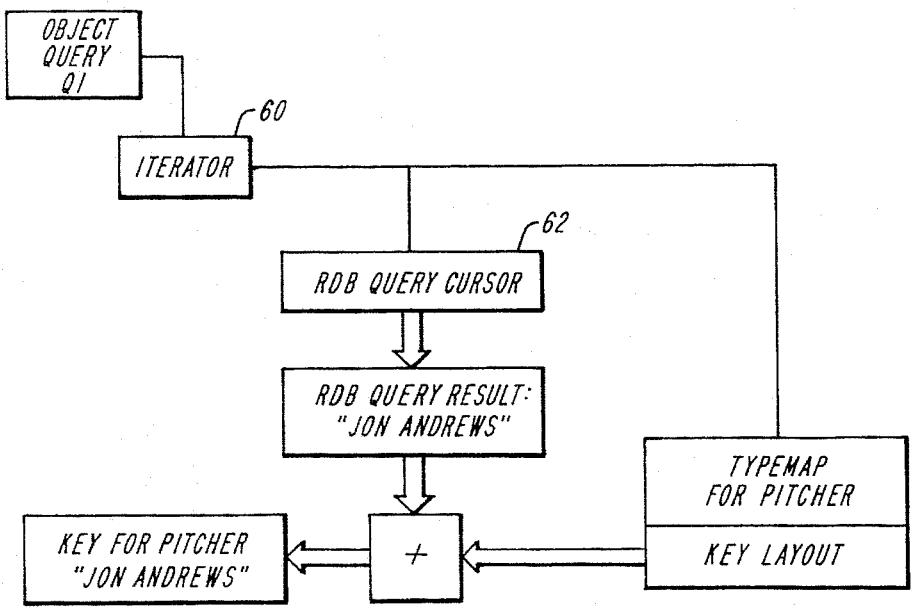
FIG. 7 is a diagrammatic representation of how an iterator and associated Typemap object cooperate to extract a result from an RDB query cursor and process it into a key.

Having determined in the previous statement that there is one or more pitcher objects resulting from the query, the next result is accessed via the line of code:

4. pitcher p=next_result_from(q1);
whereupon the external storage manager sends a message to the last iterator that indicated that it had results forthcoming. This message causes the external storage manager iterator to produce a key for the next result, as illustrated in FIG. 7 and discussed hereinafter with respect thereto.

In response to the first message, the iterator 60 and associated Typemap object 46 cooperate to extract a result from the RDB query cursor and process it into a key. The form of the query is such that it produces sufficient data to construct a key that can uniquely identify itself and a pitcher object. This would consist of a reference back to the Typemap that has the ability to create the key's associated object, and the NAME string of the PITCHER record. The query in the present example might be:

```
select NAME
from PITCHER
where SEASON_LOSSES = 0.
```

The Typemap function creates the key and checks that it is unique with respect to all other keys currently in use by the application. If it is not unique, that is, if it is a duplicate of an existing key, the new key is immediately discarded and the existing key that it matched is used in its place. The matching of keys is accomplished by sending messages to the keys, allowing maximum flexibility in the determination of what constitutes a unique key. In this example a duplicate would be defined as a key with a reference to the same Typemap and the same NAME string. The unique key is passed back to the mechanism.

Figure 8:
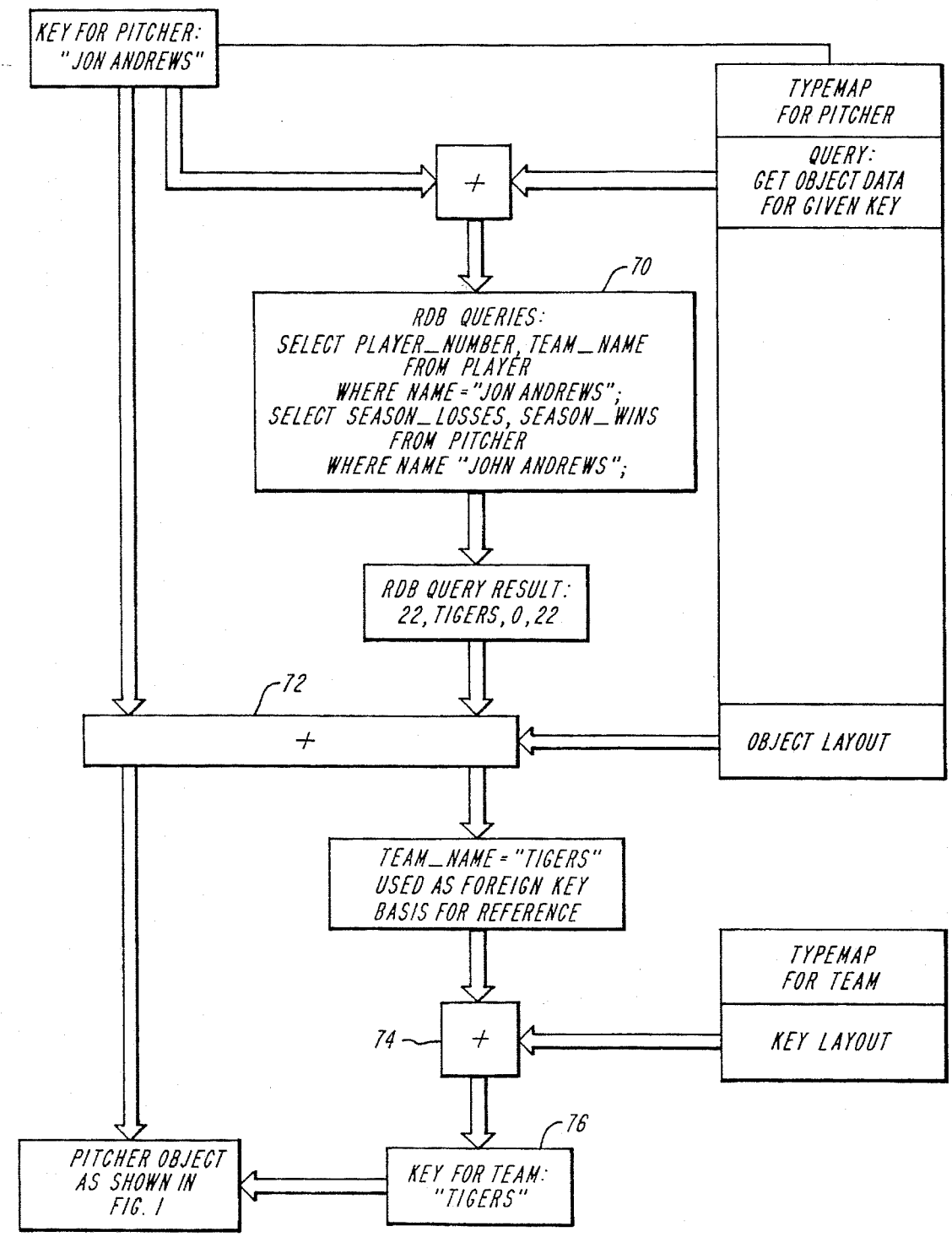
FIG. 8 illustrates the process of constructing an object from a key.

As illustrated in FIG. 8, the external storage manager then sends a second message, this one to the key, to produce the pitcher object associated with that key. The message passed to the key causes it to check if its associated object is already being accessed by the application. If the associated object is already being accessed by the application, the key produces the existing object (whose address is cached on the key). In the event that either or both the key and pitcher object reside in the application's memory cache, the external storage manager 28 need only locate the existing object in memory for the application. Thus, redundant access to the data store and problems with data replication are avoided by accessing the required data/object from cache via its object identity or key.

FIG. 8 illustrates the process of constructing an object from a key, which must occur if the associated object is not already being accessed by the application. The key sends a message to the Typemap that created it indicating the need to create the object. This message causes the Typemap to generate a query 70 based on the key and Typemap information, which query 70 goes to the RDB to gather the data required to create the associated object. The data gathered for creating the object includes: data from the key; any extra data cached from the original query that produced the key (not shown in FIG. 8); and/or data from the RDB queries. The collected data is formatted 72 in accordance with the object layout expected by the OOP application and as stored in the repository as part of the Typemap information.

The data to be formatted must be sufficient to initialize any attributes and any references to other objects (referents) defined by the type of the object being constructed. The initialization of attributes tends to be straightforward, needing only to account for the variations of numeric and string formats supported by the current object oriented programming system and the current data storage facility being accessed.

The initialization of references for the object being constructed is slightly more complex. It relies on the ability to construct keys to uniquely denote referent objects. The Typemap of the referent actually constructs such a key. Sufficient data is collected to construct the key of each referent 74. The key is constructed using such sufficient data from the query and the key layout information of the Typemap associated with the referent. The referent's key is verified to be unique. If not unique, i.e. there is an existing duplicate, the key is immediately deleted and replaced in the processing that follows by its existing duplicate (just as was done for the key of the object currently under construction). The address of the unique key object 76 forms the basis for the reference value which is incorporated in the newly constructed object.

In the "pitcher" example, the "pitcher" object may be constructed as follows:

1. the name attribute is set from the key's NAME string.
2. the player_number attribute is set from data retrieved with the following query using the key's NAME string value (here denoted by . . . ):

```
select PLAYER_NUMBER, TEAM_NAME
from PLAYER
where NAME-". . .";
```

3. the current_season_losses attribute is, similarly, set from data retrieved with the following query using the key's NAME string value (here denoted by . . . ):

```
select SEASON_LOSSES, SEASON_WINS
from PITCHER
where NAME-". . .";
```

4. the current_season_wins attribute is set based on the query in step 3 above.
5. the plays_for reference is set based on the query in step 2 above, except that the corresponding data (TEAM_NAME) is formed into a key. This key is constructed by retrieving the Typemap for the type and team from the repository and sending a message to that Typemap requesting a key corresponding to the team object with the given TEAM_NAME. The plays_for reference is initialized using the address of this key.

The above queries could have been combined into a single JOIN query, as known in the art, if such ODBMS functionality is available and gives better performance. This would not alter the results. Also, some or all of the data retrieved by these queries could have been retrieved and cached when the original query was executed to construct the key. This could improve performance on the first access to the object at the cost of complexity and possible retrieval of unused data when the key and object already exist and are being accessed by the application.

With all attributes and references initialized, the key caches the address/location of the new object and returns this address to the external storage manager.

The pseudocode line:

5. team the_team=the_pitcher plays_for; indicates that the application developer intends to traverse from the pitcher object to the team object via the reference.

The external storage manager detects that the reference is based on a key and sends the key a message producing the key's associated object.

The first time each key corresponding to a team is sent the message, it issues queries to create the team object in a similar fashion to how the pitcher object was constructed, as described hereinbefore. When the same key subsequently receives the message (because more than one pitcher whose current_season_losses attribute is zero was on the same team), the key simply returns the cached address of the team object retrieved the first time. The process for construction of the team object from the team key is similar to the process for construction of the pitcher object, as described above with respect to FIG. 8.

The processing code:

```
6.          print (the_pitcher name,
                   "who plays for the",
                   the_team.name);
``` results in the attributes of the objects being printed by an I/O function. At this point, the object attributes are accessed normally by the object oriented programming system without recourse to the external storage manager mechanism.

Finally, with respect to the present example, the transaction is committed via the code:

7. commit_a_transaction( ).

Any changes made since the last transaction start are atomically made accessible to other transactions and any changes made by other transactions are made accessible to this process. The external storage manager mechanism notes the close of a transaction and notifies all (other) currently active storage managers to commit the transaction. The external storage manager associated with the RDB system issues a "COMMIT TRANSACTION" statement to atomically affect the RDB.

EXAMPLE 2

The external storage manager mechanism also causes any updates made to objects by the application to be reflected in the stored data. This is shown in the following example which creates a new pitcher and changes the team of another in the RDB external data store of the present illustration. The representative pseudocode is as follows:

```
1.   start_a_transaction ( );
2.   query pitcher_query ("THE pitcher WITH name =
     'John Smith'");
3.   pitcher smith - the_ext_result_from (pitcher_query);
4.   query team_query ("THE team WITH name =
     'Tigers'");
5.   team tigers = the_next_result_from (team_query);
6.   smith plays_for = tigers;
7.   store (the_pitcher);
8.   pitcher the_rookie = create_a_new_pitcher_named
     ("Jackie Jones");
9.   the_rokie.player_number = 7;
10.  the_rookie.current_season_losses = 0;
11.  the_rookie.current_season_wins = 0;
12.  the_rookie.plays_for = tigers;
13.  store (the_rookie);
14.  commit_a_transaction ( ).
```

In greater detail, these steps break down as discussed hereinafter. The code:

1. start a transaction( ); has the same affect as in EXAMPLE 1. Also, as in EXAMPLE 1, the code:

2. query pitcher_query("THE pitcher WITH name='John Smith'"); invokes the ODBMS query processor to start an indexed query, as discussed hereinbefore.

Accordingly, the external storage manager mechanism 26 queries its repository 30 to determine that a specific RDB contains data for pitcher objects and participates in index operations on name. The storage manager object 28 associated with that RDB is retrieved from the repository and is made active. The storage manager object 28 is sent a message to participate in the current indexed query. The protocol surrounding this message expects the storage manager 28 to produce a reference to an iterator object. The storage manager's 28 response to this message is typically to note the type involved in the query (pitcher), select the Typemap object appropriate for that type, and pass along the message to the Typemap object, which is expected to produce the iterator. In turn, an iterator object's protocol requires it to produce successive values in a series whenever it receives a certain message, until the series of values is exhausted. In this case, the iterator is expected to produce successive results of the query (references to pitcher objects).

The newly active external storage manager 28 associated with the relevant external data store 22 (RDB) detects that an application transaction is already in progress. In response, it establishes a connection to the RDB and issues a "START TRANSACTION" command to the RDB to bring it up to date. The Typemap object responds to the message to participate in the indexed query by producing a reference to an associated storage manager iterator object. The iterator object is constructed to be associated with a query to the RDB and typically references the "query cursor" associated with the status of such a query. The exact format of the RDB query will be discussed below.

The code:

3. pitcher smith—the_next_result_from (pitcher_query); accesses the single result of the query. The external storage manager mechanism 26 sends a message to the iterator that indicated that it had a result in response to the query. This message causes the iterator to produce the key of the next result, as described hereinbefore. The external storage manager mechanism 26 then sends a second message, this one to the key, to produce the key's associated object (also as described hereinbefore).

In response to the first message, the iterator and associated Typemap object cooperate to extract a result from the RDB query cursor. The form of the query is such that it produces sufficient data to construct a key that can uniquely identify itself and a pitcher object. This would consist of a reference back to the Typemap that has the ability to create the key's associated object, and the NAME string of the PITCHER record. The query in our example might be:

```
select name
from PITCHER
where NAME = 'John Smith';
```

In the case of this query, since the data required for the key is identical to the data passed into the query, the query serves to confirm that the described object exists. The Typemap constructs the key and checks that it is unique with respect to all other keys currently in use by the application. If it is not unique, that is, if it is a duplicate of an existing key, the new key is immediately discarded and the existing key that it matched is used in its place. The matching of keys is accomplished by sending messages to the keys, allowing maximum flexibility in the determination of what constitutes a unique key. In this example, a duplicate would be defined as a key with a reference to the same Typemap and the same NAME string. The key is passed back to the external storage manager mechanism 26.

The message passed to the key has the same effect as described in EXAMPLE 1 with respect to step (or code line) 4.

The query processor is invoked to start an indexed query, by the code:

4. query team_query("THE team WITH name='Tigers'");.

The external storage manager mechanism 26 queries its repository 30 to determine that the same external storage manager that it activated to process pitcher data also stores team data. As before, the storage manager object 28 is sent a message to participate in the current indexed query, which produces an iterator that can produce query results.

The processing required to access a team by name is identical to that which was used to access a pitcher by name, except for the RDB Table (PITCHER VS. TEAM) specified in the query and the details of the attribute and reference data stored and formatted into the object.

The single result of the query is accessed upon execution of the code:

5. team tigers=the_next_result_from(team_query);.

The processing is identical to that discussed hereinbefore with respect to the pitcher query. The external storage manager mechanism 26 again sends a message to the iterator that indicated that it had a result. This message causes the iterator to produce the key of the next result. The external storage manager mechanism 26 then sends a second message, this one to the key, to produce the key's associated object.

Again, the processing follows the same structure as the pitcher query, except for the difference in the details of which tables and attributes were queried to initialize which attributes and references.

Upon execution of the code:

6. smith.plays_for=tigers; the plays_for reference from the pitcher, smith, to its team is set to refer to the team object, tigers. In some object oriented database programming systems, such an update operation automatically marks the object so that the system will refresh the object's representation in storage when the transaction is committed.

In this instance in the present illustration, the external storage manager mechanism 26 re-initializes the reference to a value based on the address of the key associated with the team object, tigers.

Figure 9:
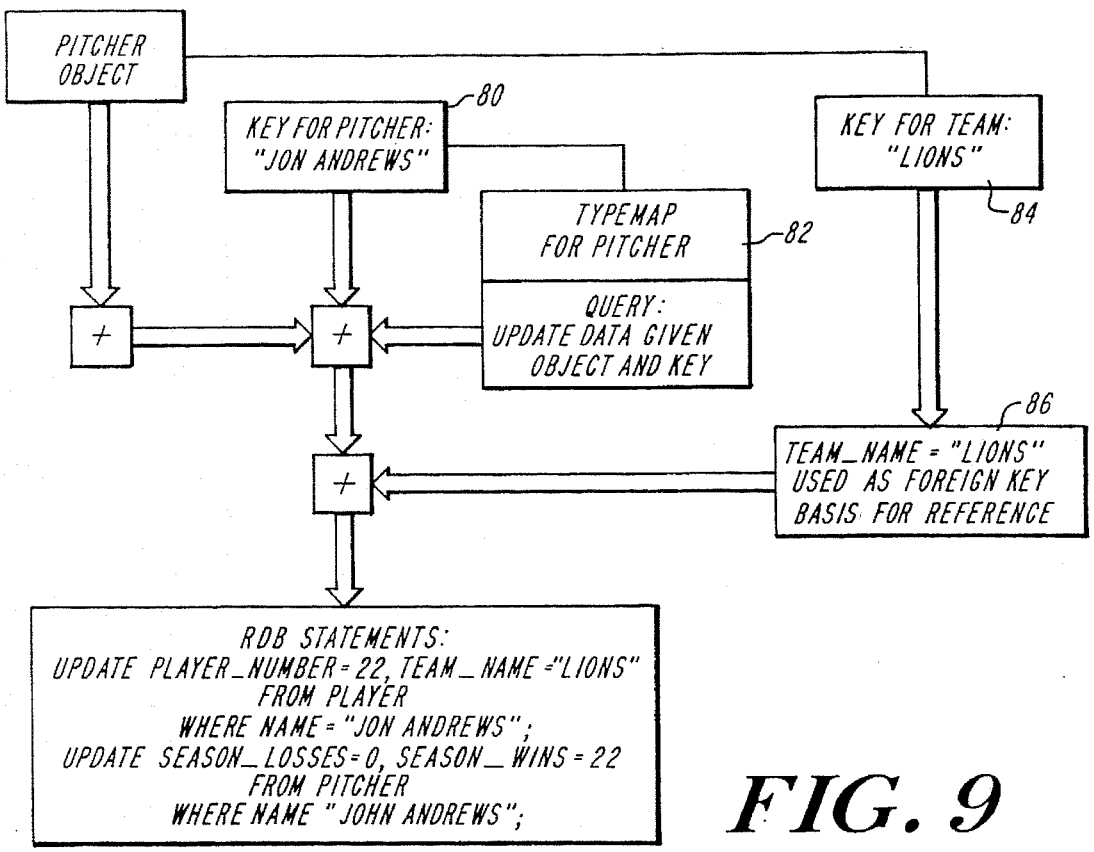
FIG. 9 is a diagrammatic representation of storing data in an object in an integration environment according to the invention.

The code:

7. store(the_pitcher);
refreshes the representation of the pitcher object in persistent storage to reflect the change made to it, as illustrated in FIG. 9. In object oriented database programming systems that automatically mark any updated objects, this statement would not be coded by the application programmer. Instead, the system would invoke this functionality on each updated object as the implicit first step in committing the transaction (step 14 below). The expected functionality is the same, regardless of whether it is invoked explicitly or implicitly.

The external storage manager mechanism 26 sends a message to the key associated with the object requiring the key 80 to refresh the data in the associated data storage facility that was used to construct the object. The key passes this message along to the Typemap 82 that created the key and the object.

The Typemap 82 applies the reverse of the transformation that created the object, as described hereinbefore. As depicted in FIG. 9, each piece of data stored in the attributes and references of the object must be used to refresh the corresponding record(s) in the data storage facility. For the pitcher object, the key 84 associated with the team object referent 86 of its plays_for reference must be accessed to extract the TEAM_NAME attribute value. The other attribute values are extracted from the attributes of the pitcher object. The resulting SQL commands would be executed where each ". . . " represents an actual attribute value extracted from the pitcher object.

```
update SEANS_WINS = . . .
    SEASON_LOSSES = . . .
from PITCHER
where NAME '2 . . .;
update PLAYER_NUMBER = . . .
    TEAM_NAME = . . .
from PLAYER
where NAME '2 . . .
```

Subsequently, a new pitcher object is created upon execution of the code:

8. pitcher the_rookie=create_a_new_pitcher_named-("Jackie Jones");

The external storage manager mechanism 26 need not be involved at this step of the process. However, if there is any ambiguity as to which data storage facility will store the new object, the system or the application must make that determination. This determination comes into play when the object needs to be stored or referenced for the first time. Creation of new objects in a scenario supporting multiple data storage facilities that store data for the same type of objects presents the only case in which the application developer need be aware of the underlying storage facilities.

The various attributes and references of the new object are initialized with the following code lines.

9. the_rookie.player_number=7;

10. the rookie.current_season_losses=0;

11. the rookie.current_season_wins=0;

12. the_rookie.plays_for=tigers;

The external storage manager mechanism 26, similarly is not involved in simple attribute access, which is left to the application program and/or relevant external data store. The external storage manager mechanism merely initializes references based on the address of the referent's key.

The code:

13. store(the_rookie); effects writing of the data for this object to an external data storage facility. As stated above, in some systems, this step may be invoked on any updated objects by the system on behalf of the user, as the first step of committing a transaction. In other systems, it is an explicit step. In either case, the processing is the same.

The external storage manager mechanism 26 detects that there is not yet a key associated with the object. It constructs one by sending a message to the Typemap corresponding to the type of the object and its intended external storage manager (for its intended data storage facility). To store the object, the mechanism sends a message to the key. The key passes the message to the Typemap that created it.

The Typemap constructs the key based on fixed attributes of the object, in our example the pitcher's name attribute. The Typemap stores the new object's data using a similar procedure as it used to refresh an existing object's data. The difference is that it may have to specify default values for any data that is required by the data storage facility but has no analog in the object model. This concern can sometimes be avoided by maintaining a close correspondence between the information represented in the object model and that represented in the external data storage facility. So, based on the pitcher attributes and the TEAM_NAME value derived from the plays_for reference's key, the following query would be issued:

```
update SEASON_WINS = . . .,
    SEASON_LOSSES = . . .,
    CAREER_WINS = 0,
    CAREER_LOSSES = 0,
    CAREER_STARTS = 0,
    CAREER_SAVES = 0,
    CAREER_GAMES = 0,
    SEASON_SAVES = 0,
    SEASON_GAMES = 0
from PITCHER
where NAME = . . .;
update PLAYER_NUMBER = . . .,
    TEAM_NAME = . . .,
    CAREER_BATTING_AVERAGE = 0,
    SEASON_BATTING_AVERAGE = 0
from PLAYER
where NAME '2 . . .;
```

Any changes made since the last transaction start are atomically made accessible to other transactions, and any changes made by other transactions are made accessible to this process by the code:

4. commit_a_transaction( );

The mechanism notes the close of a transaction and notifies all currently active storage managers to commit the transaction. In response, the external storage manager for the RDB issues a "COMMIT TRANSACTION" statement to the RDB.

EXAMPLE 3

The following program would be used to purge a pitcher object from the object database.

```
1.  start_a_transaction ( );
2.  query pitcher_query ("THE pitcher WITH name =
    'John Smith'");
3.  pitcher smith = the_next_result_from (pitcher_query);
4.  delete (smith);
5.  commit_a_transaction ( );
```

Steps 1 through 3 and 5 would have the same affect as described hereinbefore in Example 2.

Figure 10:
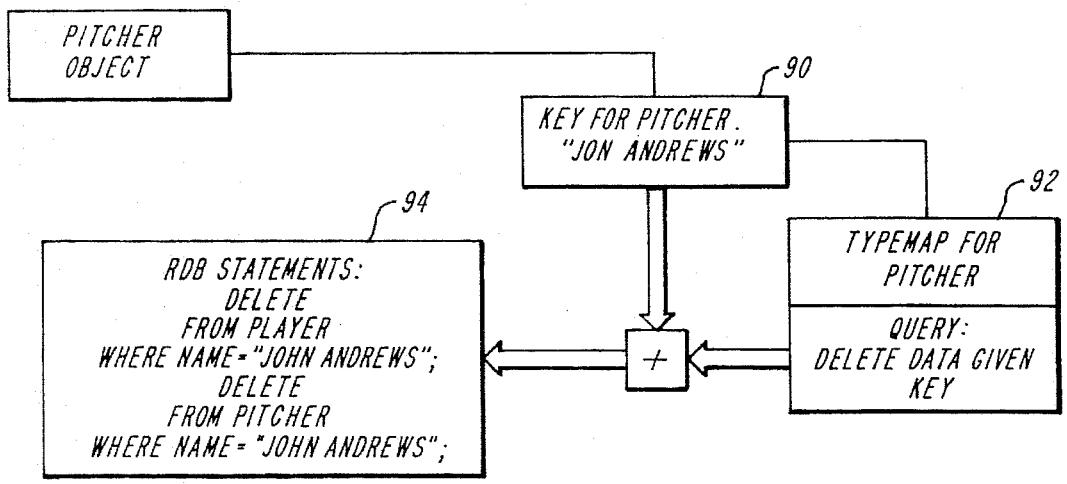
FIG. 10 is a diagrammatic representation of deletion of an object from the external relational database in an integration environment according to the invention.

The code:

3. pitcher smith=the_next_result_from(pitcher_query); deletes the object from the database. As illustrated in FIG. 10, the external storage manager mechanism 26 sends a message to the object's key 90. The key passes the message along to the Typemap 92.

The Typemap 92 issues the following SQL commands 94 based on the data in the key represented by ". . .":

```
DELETE
from PITCHER
where NAME = . . .;
DELETE
from PLAYER
where NAME = . . .;
```

This effects deletion of the object from the external relational database as depicted in FIG. 10.

The illustrative implementation, setforth hereinbefore, of an integration environment according to the invention effectively integrates an external relational data store with an ODBMS by implementing a flexible interface between the relational and object paradigms.

Although the illustrative embodiment described hereinbefore includes examples wherein data from relational databases is mapped to object applications, it should be appreciated the reverse can effectively be implemented according to the invention, and that other types of storage facilities can be accessed according to the invention including hierarchical and network databases, simple data files, other object oriented databases, or combinations of these formats.

Further, while the functionality described illustrates: purging objects created from mapped relational data; constructing iterators and RDB query cursors to implement an object query in the context of an RDB; constructing keys for the purposes of constructing objects from relational data; and updating/changing objects and relational data, among other things, it will be appreciated that additional functionality can be implemented using the functions and concepts disclosed hereinbefore.

Although iterators, as known in the art, are used in association with particular external storage managers as described herein, it should be appreciated that external storage management according to the invention can be implemented with a common iterator protocol, or dedicated iterators serving particular types of storage managers.

While the invention has been shown and described with respect to an illustrative embodiment thereof, various other changes, omissions and additions in the form and detail thereof may be made therein without departing from the spirit and scope of the invention.

What is claimed is:

1. Apparatus for integrating non-object structured data, stored in an external data store having an external data store interface, with at least one object application which processes object data structures through an ODBMS application interface, comprising:

a storage manager mechanism responsive to said ODBMS application interface and said external data store interface, including, a first interface, between said ODBMS application interface and said storage manager mechanism, said first interface comprising a plurality of first interface constructs including objects, references, indices, extensions and transactions, and facilitating handling of said plurality of first interface constructs for communicating with said ODBMS application interface to transfer object data structures between said storage manager mechanism and said at least one object application;

an integral mapping mechanism responsive to said first interface and receiving at least some of said plurality of first interface constructs, said mapping mechanism mapping said at least some of said plurality of first interface constructs to a plurality of second interface constructs to effect transformation of object data structures to non-object structured data for storage in said external data store and to effect transformation of non-object structured data to object data structures for use by said at least one object application; and a second interface between said mapping mechanism and said external data store, said second interface comprising said plurality of second interface constructs and facilitating handling of said plurality of second interface constructs for communicating with said external data store interface to transfer non-object structured data between said storage manager mechanism and said external data store.

2. The apparatus of claim 1 wherein said external data store is at least one relational database.

3. The apparatus of claim 1 wherein said storage manager mechanism includes a repository storing information for mapping said at least some of said plurality of first interface constructs to at least some of said plurality of second interface constructs.

4. The apparatus of claim 3 wherein said repository includes schema information describing the structure of data stored in said external data store.

5. The apparatus of claim 2 wherein said second interface communicates directly with said external data store and said plurality of second interface constructs includes a key construct which identifies a particular record in said external data store.

6. The apparatus of claim 2 wherein said second interface communicates directly with said external data store and said plurality of second interface constructs includes a typemap construct which defines the transformation between non-object structured data and object data structures.

7. The apparatus of claim 2 wherein said second interface communicates directly with said external data store and said plurality of second interface constructs includes a typemap construct which defines the transformation between non-object structured data and object data structures, and a key construct which identifies a particular record in said external data store.

8. The apparatus of claim 7 wherein each said typemap construct includes key layout information for constructing a respective key construct from key data stored in said external data store.

9. The apparatus of claim 7 wherein each said typemap construct includes object layout information used in constructing a respective object from object layout data stored in said external data store.

10. The apparatus of claim 3 wherein said repository includes a database management system managing the information in said repository.

* * * * *

UNITED STATES PATENT AND TRADEMARK OFFICE
CERTIFICATE OF CORRECTION

PATENT NO. : 5,542,078                              Page 1 of 2

DATED     : July 30, 1996

INVENTOR(S) : Paul A. Martel and Craig S. Harris

It is certified that errors appear in the above-identified patent and that said Letters Patent is hereby corrected as shown below:

Column 5, line 53, "SM APE 24" should read --AM API 24--.

Column 6, line 30 (in chart), "the Type" should read --theType--.

Column 14, line 62, "$OC_{13}true$" should read --OC__true--.

Column 15, line 20, "return. OC__true" should read --return OC__true--.

Column 19, line 15, "Instance count query virtual unsigned" should read
--Instance count query
   virtual unsigned--.

Column 19, line 28, "__StorageManagerbased" should read --StorageManager-based--.

Column 19, line 33, "addToCommon" should read --addToAllCommon--.

Column 34, line 54, "virtaul" should read --virtual--.

Column 45, line 9, "External Key OC__ExternalTypeMappedKey" should read
--External Key
    OC__ExternalTypeMappedKey--.

Column 46, line 49, "represent6d" should read --represented--.

Column 48, line 3, "$CAREER\_{_I BATTING}\_AVERAGE$" should read --CAREER__BATTING__AVERAGE--.
133019

UNITED STATES PATENT AND TRADEMARK OFFICE
CERTIFICATE OF CORRECTION

PATENT NO. : 5,542,078

DATED : July 30, 1996

INVENTOR(S) : Paul A. Martel and Craig S. Harris

It is certified that errors appear in the above-identified patent and that said Letters Patent is hereby corrected as shown below:

Column 53, line 30 (line 9 of EXAMPLE 2), "__ROKIE.PLAYER__" should read --__ROOKIE.PLAYER__--.

Dolumn 55, line 54, "SEANS" should read --SEASONS--.

Column 55, line 56, "where NAME '2...;" should read --where NAME =...;--.

Column 55, line 60, "where NAME '2...;" should read --where NAME =...--

Column 56, line 62, "where NAME '2...;" should read --where NAME =...;--.

Column 57, line 1, "4.commit__a__transaction();" should read --14. commit__a__transaction();--.

Signed and Sealed this

Thirty-first Day of August, 1999

Attest:

Q. TODD DICKINSON

*Attesting Officer*   *Acting Commissioner of Patents and Trademarks*